(12) United States Patent
Kuroda et al.

(10) Patent No.: US 12,517,134 B2
(45) Date of Patent: Jan. 6, 2026

(54) BODY FLUID ANTIBODY BIOMARKER FOR HIGHLY SENSITIVE DETECTION OF RISK OF ONSET OF CEREBRAL INFARCTION

(71) Applicants: FUJIKURA KASEI CO., LTD., Tokyo (JP); NATIONAL UNIVERSITY CORPORATION CHIBA UNIVERSITY, Chiba (JP); THE UNIVERSITY OF OSAKA, Osaka (JP)

(72) Inventors: Hideyuki Kuroda, Kuki (JP); Rika Nakamura, Kuki (JP); Go Tomiyoshi, Kuki (JP); Takaki Hiwasa, Kuki (JP); Kazumasa Yamagishi, Chiba (JP); Shoichiro Tsugane, Tokyo (JP); Norie Sawada, Tokyo (JP); Hiroyasu Iso, Suita (JP)

(73) Assignees: FUJIKURA KASEI CO., LTD., Tokyo (JP); NATIONAL UNIVERSITY CORPORATION CHIBA UNIVERSITY, Chiba (JP); THE UNIVERSITY OF OSAKA, Suita (JP)

( * ) Notice: Subject to any disclaimer, the term of this patent is extended or adjusted under 35 U.S.C. 154(b) by 711 days.

(21) Appl. No.: 16/768,187

(22) PCT Filed: Nov. 22, 2018

(86) PCT No.: PCT/JP2018/043090
§ 371 (c)(1),
(2) Date: May 29, 2020

(87) PCT Pub. No.: WO2019/107256
PCT Pub. Date: Jun. 6, 2019

(65) Prior Publication Data
US 2021/0373032 A1    Dec. 2, 2021

(30) Foreign Application Priority Data

Nov. 30, 2017 (JP) ................................. 2017-230639

(51) Int. Cl.
*G01N 33/68* (2006.01)

(52) U.S. Cl.
CPC . *G01N 33/6854* (2013.01); *G01N 2333/4703* (2013.01); *G01N 2800/2871* (2013.01)

(58) Field of Classification Search
None
See application file for complete search history.

(56) References Cited

U.S. PATENT DOCUMENTS

| | | | |
|---|---|---|---|
| 6,596,476 B1 * | 7/2003 | Lesniewski | G01N 33/5767 435/5 |
| 2009/0047689 A1 | 2/2009 | Kolman et al. | |
| 2011/0201517 A1 | 8/2011 | Kolman et al. | |

FOREIGN PATENT DOCUMENTS

| | | |
|---|---|---|
| JP | 2011-45334 A | 3/2011 |
| JP | 2011-211989 A | 10/2011 |
| JP | 2017-143745 A | 8/2017 |
| JP | 2018-109646 A | 7/2018 |
| RU | 95 103 989 A1 | 12/1996 |
| RU | 2 123 704 C1 | 12/1998 |
| WO | 2010/057112 A2 | 5/2010 |

OTHER PUBLICATIONS

Wells, Biochemistry 29:8509-8517, 1990.*
Ngo et al., The Protein Folding Problem and Tertiary Structure Prediction, pp. 492-495, 1994.*
Bork, Genome Research 10:398-400, 2000.*
Skolnick et al., Trends in Biotech. 18(1):34-39, 2000; especially p. 36 at Box 2.*
Doerks et al., Trends in Genetics 14:248-250, 1998.*
Smith et al., Nature Biotechnology 15:1222-1223, 1997.*
Brenner, Trends in Genetics 15:132-133, 1999.*
Bork et al., Trends in Genetics 12:425-427, 1996.*
Harlow, E. and Lane, D., Antibodies: A Laboratory Manual Cold Spring Harbor Laboratory Press, Cold Spring Harbor, NY, pp. 23-26, 1988.*
Lederman et al., (A single amino acid substitution in a common African allele of the CD4 molecule ablates binding of the monoclonal antibody, OKT4 Mol Immunol. 28(11):1171-81), 1991.*
Colman et al., Effects of amino acid sequence changes on antibody-antigen interactions, Research in Immunology, 145(1): 33-36, 1994.*
Hiwasa et al Immunome Res 11: 1-9, 2015.*
Braig et al, Oncogene 32, 837-848, 2013.*
Alonso-Orgaz et al (J Proteomics 109: 368-381, 2014) (Year: 2014).*
Amarenco et al (New Engl J Med 331: 1474-1479, 1994) (Year: 1994).*
Zhang et al (Cardiovas Diabetology 14: 1-9, 2015) (Year: 2015).*
Arteriosclerosis <Arteriosclerosis / atherosclerosis—Symptoms and causes—Mayo Clinic>, downloaded on Apr. 15, 2025, 6 pages.*
Cardiovascular Diseases <Cardiovascular Disease: Types, Causes & Symptoms>, downloaded on Apr. 17, 2025, 11 pages.*
Jihye Cha et al., "Electro-hyperthermia inhibits glioma tumorigenicity through the induction of E2F1-mediated apoptosis", International Journal of Hyperthermia, vol. 31, No. 7, pp. 784-792, Sep. 14, 2015 (9 pages total).
International Search Report dated Feb. 19, 2019 from the International Searching Authority in International Application No. PCT/JP2018/043090.

(Continued)

*Primary Examiner* — Kimberly Ballard
*Assistant Examiner* — Aditi Dutt
(74) *Attorney, Agent, or Firm* — Sughrue Mion, PLLC

(57) ABSTRACT

The present invention provides a method for acquiring data relating to the onset of cerebral infarction, characterized in that the method includes determining the level of an antibody to DIDO1 protein or a portion thereof, and/or the level of an antibody to CPSF2 protein or a portion thereof, the antibody or antibodies being present in a body fluid sample collected from a living body. The invention also provides a kit for acquiring data for carrying out the method of the present invention. The invention can accurately discern signs linked to the onset of cerebral infarction.

6 Claims, 3 Drawing Sheets

Specification includes a Sequence Listing.

(56) References Cited

OTHER PUBLICATIONS

Written Opinion dated Feb. 19, 2019 from the International Searching Authority in International Application No. PCT/JP2018/043090.
International Preliminary Report on Patentability with the translation of Written Opinion dated Jun. 11, 2020 from the International Bureau in International Application No. PCT/JP2018/043090.
Nakamura et al., "An anti-deoxyhypusine synthase antibody as a marker of atherosclerosis-related cerebral infarction, myocardial infarction, diabetes mellitus, and chronic kidney disease", SM Atherosclerosis Journal, vol. 1, No. 1, Mar. 27, 2017, pp. 1-9.
Hiwasa et al., "Serum anti-DIDO1, anti-CPSF2, and anti-FOXJ2 antibodies as predictive risk markers for acute ischemic stroke", BMC Medicine, vol. 19, No. 131, 2021, pp. 1-25.
Yoshida et al., "Elevation of Autoantibody in Patients with Ischemic Stroke", Neurol Med Chir (Tokyo), vol. 58, 2018, pp. 303-310.
Carmel-Neiderman et al., "Classical and additional antiphospholipid antibodies in blood samples of ischemic stroke patients and healthy controls", Immunol Res, vol. 65, 2017, pp. 470-476.
Communication issued Jul. 28, 2021 by the European Patent Office in application No. 18883195.2.

* cited by examiner

[Fig. 1]

SEQ ID NO: 2: Amino acid sequence of DIDO1 variant 4 gene product (NM_033081.2)

MDDKGDPSNEEAPKAIKPTSKEFRKTWGFPRTTIARREGAGDAEADPLEPPPPQQQLGLSLRRSGRQFKR
TERVEQFLTIARRPGRRSMPVSLEDSGEPTSCPATDAETASEGSVESASETRSGPQSASTAVKERPASSE
KVKGGDDHDDTSDSDSDGLTLKELQNRLRRKREQEPTERPLKGIQSRLPKKRREEGPAETVGSEASDTVE
GVLPSKQEPENDQGVVSQAGKDDPESKLEGKAAQDIKDEEPGDLGRPKPECEGYDPNALYCICRQPHNNR
FMICCDPCEEWFHGDCVGISEARGRLLERNGEDYICPNCTILQVQDETHSETADQQEAKWRPGDADGTDC
TSIGTIEQKSSEDQGIKGRIEKAANPSGKKKLKIFQPVIEAPGASKCIGPGCCHVAQPDSVYCSNDCILK
HAAATMKFLSSGKEQKPKPKEKMKMPEKPSLPKCGAQAGIKISSVHKRPAPEKKETTVKKAVVVPARSE
ALGKEAACESSTPSWASDHNYNAVKPEKTAAFSPSLLYKSTKEDRRGEEKAAAMAASKKTAPPGSAVGKQ
PAPRNLVPKKSSFANVAAATPAIKKPPSGFKGTIPKRPWLSATPSSGASAAPQAGPAPAAATAASKKFPG
SAALVGAVRKPVVPSVPMASPAPGRLGAMSAAPSQPNSQIRQNIRRSLKEILWKPVNDSDDLIMTENEVG
KIALHIEKEMFNLFQVTDNRYKSKYPGIMFNLKDPKNQGLFHRVLREEISLAKLVRLKPEELVSKELSTW
KERPARSVMESRTKLHNESKKTAPRQEAIPDLEDSPPVSDSEEQQESARAVPEKSTAFLLDVFSSMLKDT
TSQHRAHLFDLNCKICTGQVPSAEDEPAPKKQKLSASVKKEDLKSKHDSSAPDPAPDSADEVMPEAVPEV
ASEPGLESASHPNVDRTYFPGPPGDGHPEPSPLEDLSPCPASCGSGVVTTVTVSGRDPRTAPSSSCTAVA
SAASRPDSTHMVEARQDVPKPVLTSVMVPKSILAKPSSSPDPRYLSVPPSPNISTSESRSPPEGDTTLFL
SRLSTIWKGFINMQSVAKFVTKAYPVSGCFDYLSEDLPDTIHIGGRIAPKTVWDYVGKLKSSVSKELCLI
PFHPATEEEEVAYISLYSYFSSRGRFGVVANNNRHVKDLYLIPLSAQDPVPSKLLPFEGPGLESPRPNII
LGLVICQKIKRPANSGELDKMDEKRTRLQPEEADVPAYPKVATVPQSEKKPSKYPLCSADAAVSTTPPGS
PPPPPPLPEPPVLKVLSSLKPAAPSPATAATTAAAASTAASSTASSASKTASPLERILQTLFGKKKSFDP
SAREPFGSTAGLPQEPKTTAEDGVPAPPLLDPIVQQFGQFSKDKALEEEEDDRFYDPEEEYDPERAFDTQ
LVERGRRHEVERAPEAAAAEREEVAYDPEDETILEEAKVTVDDLPNRMCADVRRNSVEBPAEPVAGAATP
SLVEQQKMLEELNKQIEEQKRQLEEQEEALPQQRAAVGVSMAHFSVSDALMSPPPKSSLPKAELFQQEQQ
SADKPASLPPASQASNHRDPPQARRLATETGEGEGEPLSRLSARGAQGALPERDASRGGLVGQAPMPVPE
EKEPASSPWASGEKPPAGSEQDGWKAEPGEGTRPATVGDSSARPARRVLLPTPPCGALQPGFPLQHDGER
DPFTCPGFASQDKALGSAQYEDPRNLHSAGRSSSPAGETBGDREPQARPGEGTAPLPPPGQKVGGSQPPF
QGQREPGPHALGMSGLHGPNFFGPRGPAPPFPEENIASNDGPRGPPPARFGAQKGPIPSLFSGQHGPPPY
GDSRGPSPSYLGGPPGVAPSQFEERKDPHGEKREFQDAPYNEVTGAPAQFEGTEQAPFLGSRGGAPFQFG
GQRRPLLSQLKGPRGGPFPSQFGGQRGPPPGHFVGPRGPEPSQFETARGPHPNQFEGPRGQAPNFMPGPR
GIQPQQFEDQRVHSPPRFTNQRAPAPLQFGGLRGSAPFSEKNEQTFSRFHFQGQAPQVMKPGPRPLLELP
SHFPQHRKDRWEEAGPPSALSSSAPGQGPEADGQWASADFREGKGHEYRNQTFEGRQRERFDVGPKEKPL
EEPDAQGRASEDRRRERERGRNWSREBDWDRPREWDRHRDKDSSRDWDRNRERSANRDREREADRGKEWD
RSRERSRNREREPDPRRDRDRSRSRERDRDKARDRERGRDRKDPSKSKESARDPKPEASPASDAGTASQA

Total: 2,240 amino acid residues
Note: Underlined is a sequence employed as a peptide antigen

[Fig. 2]

SEQ ID NO: 6: Amino acid sequence of CPSF2 protein

MTSIIKLTTLSGVQEESALCYLLQVDEFRFLLDCGWDEHFSMDIIDSLRKHVHQIDAVLLSHPDPLHLGA
LPYAVGKLGLNCAIYATIPVYKMGQMFMYDLYQSPHNTEDFTLFTLDDVDAAFDKIQQLKFSQIVNLKGK
GHGLSITPLPAGHMIGGTIWKIVKDGEEEIVYAVDFNHKREIHLNGCSLEMLSRPSLLITDSFNATYVQP
RRKQRDEQLLTNVLETLRGDGNVLIAVDTAGRVLELAQLLDQIWRTKDAGLGVYSLALLNNVSYNVVEFS
KSQVEWMSDKLMRCFEDKRNNPFQFRHLSLCHGLSDLARVPSPKVVLASQPDLECGFSRDLFIQWCQDPK
NSIILTYRTTPGTLARFLIDNPSEKITEIELRKRVKLEGKELEEYLEKEKLKKEAAKKLEQSKEADIDSS
DESDIEEDIDQPSAHKTEHDLMMKGEGSRKGSFPKQAKKSYPMFPAPEERIKWDEYGEIIKPEDFLVPEL
QATEEEKSKLESGLTNGDEPMDQDLSDVPTKCISTTESIEIKARVTYIDYEGRSDGDSIKKIINQMKPRQ
LIIVHGPPEASQDLAECCRAFGGKDIKVYMPKLHETVDATSETHIYQVRLKDSLVSSLQFCKAKDAELAW
IDGVLDMRVSKVDTGVILEEGELKDDGEDSEMQVEAPSDSSVIAQQKAMKSLFGDDEKETQEESEIIPTL
EPLPPSEVPGHQSVFMNEPRLSDFKQVLLREGIQAEFVGGVLVCNNQVAVRRTETGRIGLEGCLCQDFYR
IRDLLYEQYAIV

Total: 782 amino acid residues
Note: Underlined is a sequence employed as a peptide antigen

[Fig. 3]

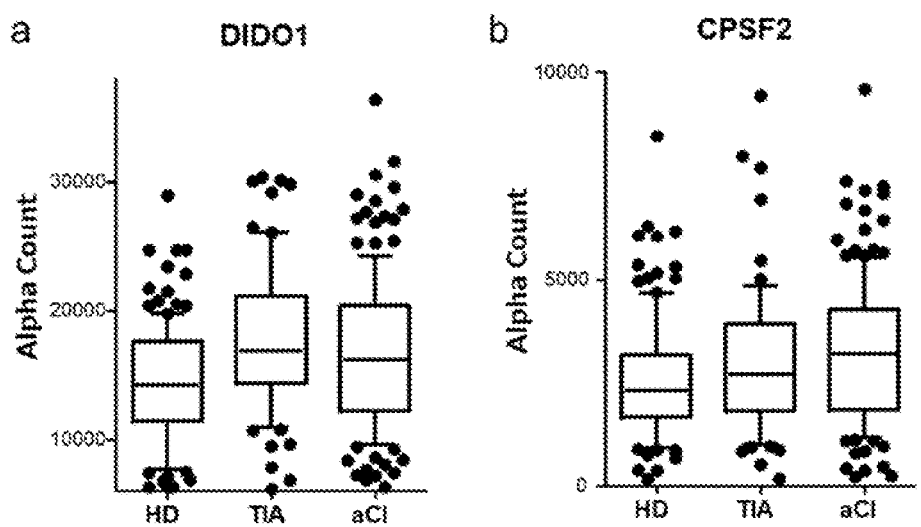

[Fig. 4]
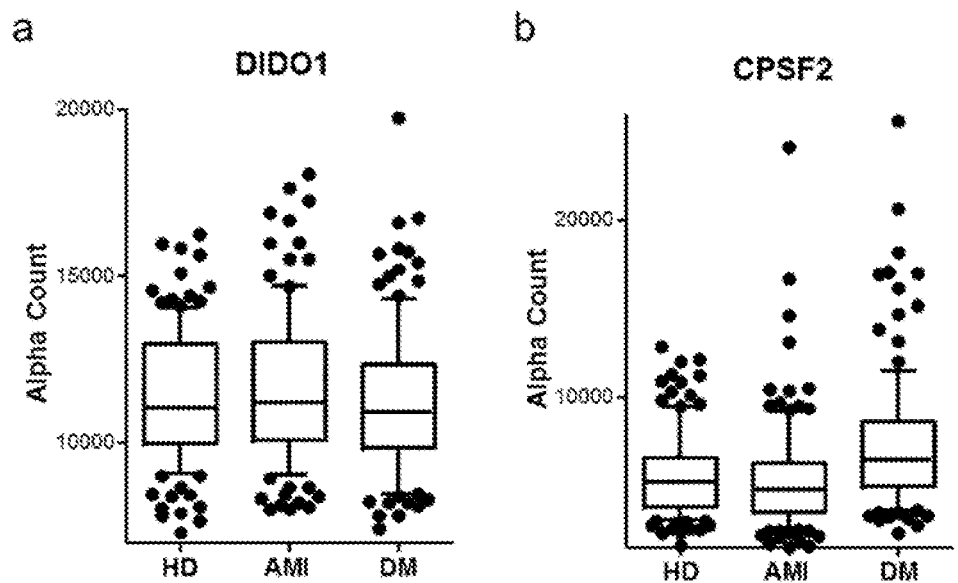
[Fig. 5]
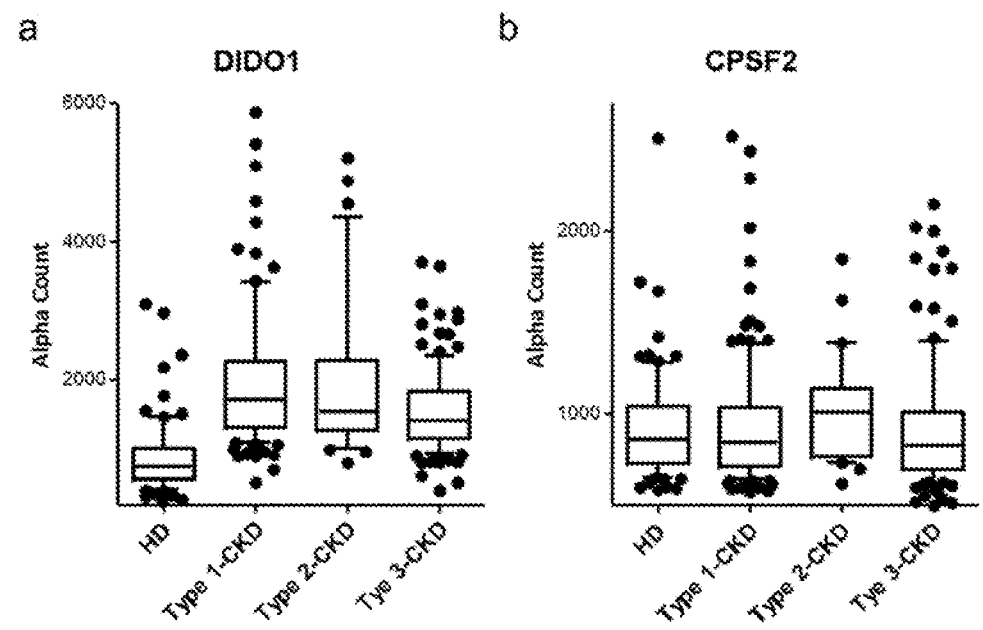

BODY FLUID ANTIBODY BIOMARKER FOR HIGHLY SENSITIVE DETECTION OF RISK OF ONSET OF CEREBRAL INFARCTION

CROSS REFERENCE TO RELATED APPLICATIONS

This application is a National Stage of International Application No. PCT/JP2018/043090 filed Nov. 22, 2018, claiming priority based on Japanese Patent Application No. 2017-230639, filed Nov. 30, 2017.

TECHNICAL FIELD

The present invention relates to means for detecting a disease. More particularly, the invention relates to means for discerning the onset risk of cerebral infarction by detecting, as a biomarker, an antibody in body fluid to DIDO1 protein or to CPSF2 protein, or to a peptide having a partial sequence thereof.

BACKGROUND ART

In many cases, cerebral infarction directly causes death. Even if a patient thereof does not die, the patient is forced to do rehabilitative exercises for a long period of time. Cerebral infarction is a top cause of becoming bedridden. Therefore, cerebral infarction is a burden to the patient and his/her family and, from a social aspect, elevates national health expenditure. Thus, prevention of the onset of cerebral infarction is an important issue. If a subtle symptom of cerebral infarction can be detected so as to predict the coming onset thereof, the onset of cerebral infarction would be prevented at considerably high probability through a pre-onset treatment or improvement of lifestyle.

Hsp60 (Non-Patent Document 1), RPA2 (Non-Patent Document 2), and SOSTDC1 (Non-Patent Document 3) have been reported as indicators for discerning the condition of cerebral infarction. Also, as disease biomarkers in relation to cerebral infarction, the following have been known: arteriosclerosis-related substances such as high-density lipoprotein (HDL)-cholesterol, low-density lipoprotein (LDL)-cholesterol, total cholesterol (TC) (Non-Patent Document 4), adiponectin (Non-Patent Document 5), uric acid (Non-Patent Document 6), ATP2B4 (Non-Patent Document 7), BMP-1 (Non-Patent Document 7), DHPS (Non-Patent Document 8), and SH3BP5 (Non-Patent Document 9); cardiovascular disorder-related substances such as phospholipid (Non-Patent Document 10), apolipoprotein A-1 (Non-Patent Document 11), oxidized low-density lipoprotein (Non-Patent Document 12), and heat shock proteins (Hsps) (Non-Patent Document 13); and diabetes-related substances such as insulin (Non-Patent Document 14), glycohemoglobin (HbA1c) (Non-Patent Document 15), glutamic acid decarboxylase (GAD) (Non-Patent Document 16), and protein tyrosine phosphatase IA-2 (Non-Patent Document 17).

PRIOR ART DOCUMENTS

Non-Patent Documents

Non-Patent Document 1: Kramer J, Harcos P, Prohaszka Z, Horvath L, Karadi I, Singh M, Csaszar A, Romics L, Fust G. Frequencies of certain complement protein alleles and serum levels of anti-heat-shock protein antibodies in cerebrovascular diseases. Stroke 2000; 31:2648-2652.

Non-Patent Document 2: Machida T, Kubota M, Kobayashi E, Iwadate Y, Saeki N, et al. Identification of stroke-associated-antigens via screening of recombinant proteins from the human expression cDNA library (SEREX). J Translat Med 2015; 13:71.

Non-Patent Document 3: Goto K, Sugiyama T, Matsumura R, Zhang X M, Kimura R, et al. Identification of cerebral infarction-specific antibody markers from autoantibodies detected in patients with systemic lupus erythematosus. J Mol Biomark Diagnos 2015; 6:2.

Non-Patent Document 4: Libby P, Ridker P M, Hansson G K. Progress and challenges in translating the biology of atherosclerosis. Nature 2011; 473:317-325.

Non-Patent Document 5: Kadowaki T, Yamauchi T, Kubota N, Hara K, Ueki K, Tobe K. Adiponectin and adiponectin receptors in insulin resistance, diabetes, and the metabolic syndrome. J Clin Invest 2006; 116:1784-1792.

Non-Patent Document 6: Nakanishi N, Okamoto M, Yoshida H, Matsuo Y, Suzuki K, et al. Serum uric acid and risk for development of hypertension and impaired fasting glucose or type II diabetes in Japanese male office workers. Eur J Epidemiol 2003; 18:523-530.

Non-Patent Document 7: Hiwasa T, Machida T, Zhang X M, Kimura R, Wang H, et al. Elevated levels of autoantibodies against ATP2B4 and BMP-1 in sera of patients with atherosclerosis-related diseases. Immunome Res 2015; 11:097.

Non-Patent Document 8: Nakamura R, Tomiyoshi G, Shinmen N, Kuroda H, Kudo T, et al. An anti-deoxyhypusine synthase antibody as a marker of atherosclerosis-related cerebral infarction, myocardial infarction, diabetes mellitus, and chronic kidney disease. SM Atheroscler J 2017; 1:1001.

Non-Patent Document 9: Hiwasa T, Tomiyoshi G, Nakamura R, Shinmen N, Kuroda H, et al. Serum SH3BP5-specific antibody level is a biomarker of atherosclerosis. Immunome Res 2017; 13:2.

Non-Patent Document 10: Liang K P, Kremers H M, Crowson C S, Snyder M R, Therneau T M, Roger V L, Gabriel S E. Autoantibodies and the risk of cardiovascular events. J Rheumatol 2009; 36:2462-2469.

Non-Patent Document 11: Montecucco F, Vuilleumier N, Pagano S, Lenglet S, Bertolotto M, Braunersreuther V, Pelli G, Kovari E, Pane B, Spinella G, Pende A, Palombo D, Dallegri F, Mach F, Roux-Lombard P. Anti-apolipoprotein A-1 auto-antibodies are active mediators of atherosclerotic plaque vulnerability. Eur Heart J 2011; 32:412-421.

Non-Patent Document 12: Fesmire J, Wolfson-Reichlin M, Reichlin M. Effects of autoimmune antibodies anti-lipoprotein lipase, anti-low density lipoprotein, and anti-oxidized low density lipoprotein on lipid metabolism and atherosclerosis in systemic lupus erythematosus. Rev Bras Reumatol 2010; 50:539-551.

Non-Patent Document 13: Carbone F, Nencioni A, Mach F, Vuilleumier N, Montecucco F. Evidence on the pathogenic role of auto-antibodies in acute cardiovascular diseases. Thromb Haemost 2013; 109:854-868.

Non-Patent Document 14: Palmer J P, Asplin C M, Clemons P, Lyen K, Tatpati O, Ragh, P K, Paquette T L. Insulin antibodies in insulin-dependent diabetics before insulin treatment. Science 1983; 222:1337-1339.

Non-Patent Document 15: Rollins K E, Varadhan K K, Dhatariya K, Lobo D N. Systematic review of the impact of HbA1c on outcomes following surgery in patients with diabetes mellitus. Clin Nutr 2015; S0261-5614:00082-5.

Non-Patent Document 16: Baekkeskov S, Aanstoot H, Christgau S, Reetz A, Solimena M S, Cascalho M, Folli F, Richter-Olsen H, DeCamilli P. Identification of the 64K autoantigen in insulin dependent diabetes as the GABA-synthesizing enzyme glutamic acid decarboxylase. Nature 1990; 347:151-156.

Non-Patent Document 17: Payton M A, Hawkes C J, Christie M R. Relationship of the 37,000- and 40,000-M(r) tryptic fragments of islet antigens in insulin-dependent diabetes to the protein tyrosine phosphatase-like molecule IA-2 (ICA512). J Clin Invest 1995; 96:1506-1511.

Non-Patent Document 18: Libby P, Ridker P M, Hansson G K. Progress and challenges in translating the biology of atherosclerosis. Nature 2011; 473:317-325.

DISCLOSURE OF THE INVENTION

Problems to be Solved by the Invention

Cerebrovascular disorders including cerebral infarction are the 4th leading cause of the death of Japanese. As described above, cerebral infarction is a top cause of becoming bedridden. Once a patient has developed cerebral infarction, the patient is forced to do rehabilitative exercises for a long period of time and to take medicines, even if the patient does not die. Thus, prevention of the onset of cerebral infarction before it happens is an important issue. From this aspect, there have been identified various risk factors for the onset of cerebral infarction, including hypertension, hyperlipidemia, diabetes, smoking, and blood test parameters (e.g., triglyceride, LDL cholesterol, and low adiponectin level) (Non-Patent Documents 18, 5). However, difficulty is encountered in complete curing of diabetes and other risk factor diseases. An abnormal condition in a blood test does not immediately result in the onset of cerebral infarction. Although prediction of the onset has been attempted on the basis of combined risk factors, the results are not satisfactory.

Means for Solving the Problems

The present inventors have found that a symptom leading to the onset of cerebral infarction can be accurately discerned by measuring the level of an antibody to DIDO1 protein or to CPSF2 protein, or to a peptide having a partial sequence thereof in body fluid (hereinafter, such an antibody present in body fluid will be referred to as a "humoral antibody"). The present invention has been accomplished on the basis of this finding.

As used herein, the term "cerebral infarction" refers to a disease which involves narrowing a blood vessel through arteriosclerosis, triggering thrombosis, resulting in deficiency of oxygen and nutrients, and damaging cerebral nerve cells.

In a first aspect of the present invention, there is provided a method for acquiring data relating to the onset of cerebral infarction, characterized in that the method comprises determining the level of an antibody to DIDO1 protein or a portion thereof, and/or the level of an antibody to CPSF2 protein or a portion thereof, the antibody or antibodies being present in a body fluid sample collected from a living body (hereinafter, the method may also be referred to as a "data acquisition method of the present invention").

In the data acquisition method of the present invention, DIDO1 protein, serving as an antigen, which captures an assay target humoral antibody is one member selected from splicing variants 1 to 6 of DIDO1 protein (Accession Nos. 1 to 6: NM 022105.4, NM 080796.3, NM 080797.3, NM 033081.2, NM 001193369.1, and NM 001193370.1 are registered in NCBI). DIDO1 protein is also called death inducer-obliterator 1. The nucleotide sequence of the gene of DIDO1 splicing variant 4 is represented by SEQ ID NO: 1. The splicing variants 1 and 2 of DIDO1 protein are each formed of 562 amino acids; the splicing variants 3 and 6 are each formed of 1,189 amino acids; and the splicing variants 4 and 5 are each formed of 2,240 amino acids. The amino acid sequence of splicing variant 4 (the longest splicing variant of DIDO1) is represented by SEQ ID NO: 2. The DIDO1 protein portion employed as an antigen in the below-mentioned Examples is an N-terminal 275 amino acid domain from the N-terminal (SEQ ID NO: 3). This domain is a common sequence to all splicing variants of DIDO1. The DIDO1 peptide employed as an antigen in the below-mentioned Examples is a 543 to 560 amino acid domain (SEQ ID NO: 4). This domain is a common sequence to all splicing variants 3 to 6 of DIDO1. Regardless of DIDO1 protein antigen or DIDO1 peptide antigen, the similar results are obtained. Thus, the humoral antibody is not considered to distinguish different splicing variants of the DIDO1 protein that the humoral antibody recognizes. In other words, DIDO1 in the present invention is not limited to a specific splicing variant.

CPSF2 protein is also called "cleavage and polyadenylation specific factor 2," or CPSF100. The protein is registered as an Accession No. "NM 017437" in NCBI. The nucleotide sequence the CPSF2 gene and the amino acid sequence of CPSF2 protein are represented by SEQ ID NOs: 5 and 6, respectively.

The data acquisition method of the present invention may also be expressed as, for example, "a method for discerning the onset of cerebral infarction, characterized in that the method comprises determining the level of an antibody to DIDO1 protein or a portion thereof, and/or to CPSF2 protein or a portion thereof, which antibody is present in a body fluid sample collected from a living body."

In a second aspect of the present invention, there is provided a kit for acquiring data for carrying out the data acquisition method of the present invention (hereinafter may be referred to as the kit of the present invention).

The kit for acquiring data for carrying out the data acquisition method of the present invention may also be expressed as, for example, "a kit for carrying out the method for discerning the onset of cerebral infarction, characterized in that the kit determines the level of an antibody to DIDO1 protein or a portion thereof, and/or to CPSF2 protein or a portion thereof, which antibody is present in a body fluid sample collected from a living body."

Effects of the Invention

According to the present invention, there can be provided means for accurately discerning risk of the onset of cerebral infarction, the method employing a humoral antibody to DIDO1 protein or CPSF2 protein, or a peptide having a partial sequence thereof, as a biomarker. By virtue of this means, motivations to prevent the onset of cerebral infarction and to treat cerebral infarction are provided. In addition, it is possible to accurately discern the condition of an arteriosclerosis-related disease that leads to the onset of cerebral infarction.

BRIEF DESCRIPTION OF THE DRAWINGS

[FIG. 1]

An amino acid sequence (SEQ ID NO: 2) of DIDO1 protein (splicing variant 4) represented by single characters. Underlined is a portion corresponding to an amino acid sequence (SEQ ID NO: 4) of DIDO1 peptide employed in the Examples.

[FIG. 2]

A full-length amino acid sequence (SEQ ID NO: 6) of CPSF2 protein represented by single characters. Underlined is a portion corresponding to an amino acid sequence (SEQ ID NO: 7) of CPSF2 peptide employed in the Examples.

[FIG. 3]

Graphs showing the levels of antibodies to DIDO1 and CPSF2 in serum samples from healthy donors (HD), transient ischemic attack (TIA) patients, and acute cerebral infarction (aCI) patients, as determined through ALPHALISA®. Graph (a) shows the results when DIDO1 protein antigen was used, and graph (b) shows the results when CPSF2 peptide antigen was used, with each case being represented by a box-and-whisker plot. The vertical axis of each box-and-whisker plot represents the antibody level as an Alpha (amplified luminescence proximity homogeneous assay) count. Dividing lines represent percentiles of 10th (the bottom bar), 20th (the bottom of the box), 50th (center line of the box), 80th (the top of the box), and 90th (the uppermost bar), respectively.

[FIG. 4]

Graphs showing the levels of antibodies to DIDO1 and CPSF2 in serum samples from HD, acute myocardial infarction (AMI) patients, and diabetes mellitus (DM) patients, as determined through ALPHALISAR. Graph (a) shows the results when DIDO1 protein antigen was used, and graph (b) shows the results when CPSF2 peptide antigen was used, with each case being represented by a box-and-whisker plot. Definitions of the vertical axis, dividing lines, etc. are the same as described in relation to FIG. 3.

[FIG. 5]

Graphs showing the levels of antibodies to DIDO1 and CPSF2 in serum samples from HD and chronic kidney disease (CKD) patients, as determined through ALPHALISAR. Graph (a) shows the results when DIDO1 protein antigen was used, and graph (b) shows the results when CPSF2 peptide antigen was used, with each case being represented by a box-and-whisker plot. Definitions of the vertical axis, dividing lines, etc. are the same as described in relation to FIG. 3.

MODES FOR CARRYING OUT THE INVENTION (1) Data Acquisition Method of the Present Invention (a) Body Fluid Sample Collected from Living Body The "body fluid sample collected from a living body," which is a target of data acquisition in the data acquisition method of the present invention, is blood, lymph, or the like. The term "sample" refers to body fluid as collected from a body, or a processed product of the fluid. Among such body fluid samples, a blood sample is preferred. Examples of the blood sample include whole blood samples, serum samples, and plasma samples. Of these, serum samples and plasma samples are preferred, with serum samples being particularly preferred. The blood samples may undergo anti-clotting treatment (e.g., treatment with heparin) in advance.

(b) Antigen which Captures Humoral Antibody

In the data acquisition method of the present invention, DIDO1 protein having an amino acid sequence (SEQ ID NO: 2) and CPSF2 protein having an amino acid sequence (SEQ ID NO: 6) are used for capturing a humoral antibody. Each of the antigen proteins may be used in its entirety as an antigen for capturing a humoral antibody, or a portion thereof may be used. When a portion of the amino acid sequence (SEQ ID NO: 2) is used as an antigen for capturing a humoral antibody, a fragment having 7 to 1,189 consecutive amino acids selected from the amino acid sequence (SEQ ID NO: 2) may be used. A fragment having 7 to 782 consecutive amino acids selected from the amino acid sequence (SEQ ID NO: 6) may be used as an antigen for capturing the humoral antibody. When a portion of the amino acid sequence (SEQ ID NO: 2) is used as an antigen for capturing a humoral antibody, it is preferable that the portion includes the entirety or a portion of the amino acid sequence (SEQ ID NO: 3) which is included in all splicing variants of DIDO1, or is the entirety or a portion of the amino acid sequence (SEQ ID NO: 3). Furthermore, in order to establish a more efficient detection system, a shorter chain length amino acid sequence (peptide) may be selected. In this case, the number of amino acids of the amino acid sequence is preferably about 7 to about 30, more preferably about 10 to 20.

In the entirety or a portion of any of the amino acid sequences, 10% or less of the amino acid residues (the decimal point being suppressed) may undergo modification (deletion, substitution, or addition), so long as the target humoral antibody (i.e., a humoral antibody to DIDO1 protein or to CPSF2 protein, or to a peptide having a partial sequence thereof) can be captured. In other words, it is necessary to be able to discern risk of the onset of cerebral infarction when the amino acid-modified antigen candidate for capturing a target humoral antibody is used for capturing a humoral antibody through, for example, a technique similar to the technique described in the Examples of the present specification.

The term "deleting" refers to deletion of any amino acid residue in the relevant amino acid sequence. The amino acid residue at the N-terminal side of the deleted amino acid residue and that at the C-terminal side of the deleted amino acid residue are linked via a peptide bond. In the case of deletion of the N-terminal amino acid residue or the C-terminal amino acid residue, no linkage is present. The number of deleted residues is counted as "the number of amino acid deletions." The term "substituting" refers to substitution of any amino acid residue in the relevant amino acid sequence, "with another amino acid residue." The new amino acid residue is linked to the amino acid residue at the N-terminal side thereof and at the C-terminal side thereof via a peptide bond. In the case of substitution of the N-terminal side or C-terminal side amino acid residue, the amino acid residue is linked via a peptide bond to another C-terminal side or N-terminal side amino acid residue. The number of substituted residues is counted as "the number of amino acid substitutions." The term "adding" refers to addition of one or more new amino acid residues to one or more peptide bond sites in the relevant amino acid sequence, to thereby form a new peptide bond(s). Addition of an amino acid residue to the C terminal or the N terminal is also encompassed in the concept "addition." The number of added substituted amino acid residues is counted as "the number of amino acid additions."

Specific examples of preferred amino acid sequences of a peptide serving as the antigen for capturing the target humoral antibody include SEQ ID NO: 4 (AMAASKK- TAPPGSAVGKQ) (DIDO1 protein origin) and SEQ ID NO: 7 (CPSF2-607: QVRLKDSLVSSLQFC) (CPSF protein origin). Notably, the number of acceptable amino acid modification in these peptides for capturing the humoral antibody is 1, according to the above-described standard.

The antigen having a specific amino acid sequence for capturing the target humoral antibody may be obtained through a customary method. In one specific procedure, based on the nucleotide sequence of the DIDO1 gene (SEQ ID NO: 1) or the nucleotide sequence of the CPSF2 gene (SEQ ID NO: 6), nucleic acid amplification primers for amplifying a double-strand DNA including the entirety or a portion of the nucleotide sequence are designed. Through PCR or a similar technique employing the amplification primers, a gene amplification product is yielded as the entirety or a portion of the DIDO1 gene or the CPSF2 gene. The amplification product is incorporated into a prokaryotic cell expression vector (e.g., pGEX-4T), and a transformant including the vector is selected. Expression of the entirety or a portion of the DIDO1 gene or the CPSF2 gene is induced by adding a chemical agent such as IPTG (isopropyl-β-D-thiogalactoside). The entirety or a portion of the thus-formed DIDO1 protein or CPSF2 protein may be purified through, for example, affinity chromatography by use of Glutathione Sepharose (product of GE Healthcare Life Sciences).

Particularly, a peptide having a portion of the sequence of DIDO1 protein or CPSF2 protein (typically, a peptide serving as antigen for capturing a target humoral antibody, the peptide having 7 to 30 amino acid residues) may be readily produced through a known chemical peptide synthesis method. The peptide is produced through a liquid phase peptide synthesis method or a solid phase peptide synthesis method, these methods being established as customary methods. Also, the Boc solid-phase method or the Fmoc solid-phase method may be employed as a solid phase peptide synthesis method which is generally recognized as a preferable chemical synthesis method.

The entirety or a portion of DIDO1 protein or CPSF2 protein may be a commercial product. Such commercial products include ready-made products and made-to-order products.

If needed, a modification structure may be appropriately added to the protein or the peptide (i.e., an essential portion for capturing a humoral antibody), which is used as the antigen for capturing a target humoral antibody. For example, as mentioned hereinbelow, there may be employed a GST (glutathione S-transferase) fusion protein or peptide, a biotin fusion protein or peptide, etc., which are used in ALPHALISA® (Amplified Luminescence Proximity Homogeneous Assay-Linked ImmunoSorbent Assay).

(c) Method for Acquiring Data Regarding the Onset of Cerebral Infarction

According to the data acquisition method of the present invention, the level of an antibody to DIDO1 protein or a portion thereof (hereinafter may be collectively referred to as "DIDO1 antigen") and/or the level of an antibody to CPSF2 protein or a portion thereof (hereinafter may be collectively referred to as "CPSF2 antigen") in a body fluid sample collected from a living body is determined. When the determined value is greater than a standard value (cut-off value), the increase in DIDO1 antigen and/or CPSF2 antigen in the donor of the body fluid sample is confirmed. The data can be employed as an index for the onset of cerebral infarction in the body fluid sample donor.

More specifically, when the determined value is greater than a standard value (cut-off value), the increase in DIDO1 antigen or CPSF2 antigen in the body fluid sample donor is confirmed. The data can be employed as an index for the onset of cerebral infarction in the body fluid sample donor.

The standard value of the humoral antibody level with respect to the DIDO1 antigen or the CPSF2 antigen in a test sample may be derived through the following procedure. First, a control sample population is established from subjects exhibiting no abnormality (e.g., symptom of cerebral infarction) in brain MRI inspection. The level of a humoral antibody to the DIDO1 antigen or the CPSF2 antigen is determined, with respect to the test samples obtained from the control sample population. The determination data are statistically processed, to thereby obtain an average, a standard deviation, etc. The cut-off value is determined on the basis of the data.

In one possible embodiment of the humoral antibody level determination, the aforementioned antigen (i.e., protein and peptide) for capturing a target humoral antibody (i.e., "DIDO1 antigen" or "CPSF2 antigen") which is immobilized on a substrate is brought into contact with a body fluid sample collected from a relevant living body. Bonding (based on antigen-antibody reaction) between a humoral antibody to DIDO1 protein or CPSF2 protein and the corresponding antigen (i.e., antigen for capturing a target humoral antibody) is detected as a signal. More specifically, the determination can be performed through ALPHALISA®, ELISA, indirect immunofluorescence, Western blotting (immunoblotting), turbidimetry, nephelometry, latex-coagulation turbidimetry, CLEIA, or the like. All the exemplified determination techniques have been established for determining the level of a target substance (antibody) in a body fluid sample collected from a living body.

In the case of ALPHALISAR, when a GST fusion DIDO1 antigen or a GST fusion CPSF2 antigen (protein) is used as an antigen for capturing a humoral antibody, glutathione-conjugated donor beads are used, whereas when a biotinylated DIDO1 peptide or a biotinylated CPSF2 peptide is used as an antigen for capturing a humoral antibody, streptavidin-conjugated donor beads are used. The antigen for capturing a humoral antibody, a blood sample, and acceptor beads to which an anti-human IgG antibody has been bound are mixed together, and the mixture is incubated at room temperature for several hours to several days, to thereby form an antigen-antibody complex. The complex is irradiated with light (680 nm), and the resultant light having a wavelength of 520 to 620 nm is detected, whereby the target humoral antibody can be quantified. In indirect immunofluorescence assay, a body fluid sample collected from a living body is brought into contact with a protein array in which a specific antigen for capturing a humoral antibody has been immobilized on a substrate, to thereby form a complex of an antigen for capturing a humoral antibody with an anti-DIDO1 humoral antibody, or with an anti-CPSF2 humoral antibody. A fluorescent-labeled secondary antibody is brought into contact with the humoral antibody complex, whereby a humoral antibody to DIDO1 protein or CPSF2 protein can be quantified. In ELISA, quantification is performed by using a secondary antibody as in indirect immunofluorescence assay, except that the label is changed to an enzyme. The label for the secondary antibody can be selected from various enzymes. In Western blotting, an antigen for capturing a humoral antibody is subjected to electrophoresis by use of SDS-polyacrylamide gel, and the resultant band is transferred to a carrier such as a nitrocellulose membrane. Then, a body fluid sample collected from a living body is brought into contact with the carrier, to thereby form a complex of an antigen for capturing a humoral antibody with an anti-DIDO1 humoral antibody, or with an anti-CPSF2 humoral antibody. Detection of the complex is performed by use of a secondary antibody, to thereby achieve quantification. In turbidimetry or nephelometry, a body fluid sample collected from a living body is brought into contact with an antigen for capturing a humoral antibody, to thereby form a complex of the antigen for capturing a humoral antibody with an anti-DIDO1 humoral antibody, or with an anti-CPSF2 humoral antibody. Detection of the complex is performed on the basis of change in turbidity (in the case of turbidimetry) or scattered light intensity (in the case of nephelometry), to thereby achieve quantification. In latex agglutination turbidimetry, a body fluid sample collected from a living body is brought into contact with latex particles to which an antigen for capturing a humoral antibody has been bound, to thereby form agglutinated latex particles via interaction between humoral antibodies each bound to latex particles, and the thus-formed agglutinated latex particles are detected, to thereby achieve quantification. In one possible mode of CLEIA assay, a body fluid sample collected from a living body is brought into contact with magnetic particles to which an antigen for capturing a humoral antibody has been bound, to thereby form, on the surfaces of the magnetic particles, a complex of the antigen for capturing a humoral antibody with an anti-CPSF2 humoral antibody, or with an anti-DIDO1 humoral antibody. Unreacted matter is removed through collecting magnetism, and the complex is subjected to an appropriate fluorescence treatment or the like, and detected, to thereby achieve quantification.

"DIDO1 antigen" and "CPSF2 antigen," two types of antigens used for measuring or determining the levels of antibodies to the antigens in a sample collected from a living body, are common in terms of detecting biomarkers related to risk of the onset of cerebral infarction, but each antigen has its intrinsic property. By employing the two antigens singly or in combination, accurate data on the onset of cerebral infarction corresponding to various situations can be acquired.

Through determining a rise in level of an antibody to "DIDO1 antigen" in a body fluid sample collected from a living body, there can be acquired data regarding the onset of cerebral infarction particularly attributed to a chronic kidney disease as an underlying disease. It is known that a chronic kidney disease (CKD) is a renal disease with a renal disorder ≥3 months continuously and is a high risk factor of cerebral stroke or a cardiovascular disease (e.g., myocardial infarction) for the patients thereof. Characteristically, the anti-DIDO1 antibody level in body fluid steeply rises immediately before the onset of acute-stage cerebral infarction, while the antibody level lowers in the chronic stage of cerebral infarction.

Therefore, through periodically monitoring a chronic kidney disease patient in terms of the level of humoral antibody to "DIDO1 antigen," the onset of cerebral infarction in the patient can be accurately predicted. This level also serves as an index for indicating that the onset of cerebral infarction is extremely imminent. Thus, when this biomarker is high, it indicates that immediate prophylactic actions such as treatment of a kidney disease and controlling of blood pressure need to be taken. Furthermore, through monitoring the biomarker after the onset of acute cerebral infarction, transition of the cerebral infarction to the chronic stage can also be confirmed by a drop in the biomarker level.

Through determining a rise in level of an antibody to "CPSF2 antigen" in a body fluid sample collected from a living body, data can be obtained regarding the onset of cerebral infarction particularly attributed to diabetes as an underlying disease. Even in the case where biomarkers other than the CPSF2-related biomarker lower as a result of treatment of diabetes, a high humoral antibody level of a subject with respect to CPSF2 indicates that the presence of a high risk of the onset of cerebral infarction remains. As compared with the rise in level of antibody to the aforementioned "DIDO1 antigen," the CPSF2-related biomarker is found to be more sensitive to a continuous risk of the onset of cerebral infarction. When a cerebral infarction subject at a symptom-less preliminary stage exhibits "a rise in the level of a humoral antibody to CPSF2," the risk of cerebral infarction in the subject can be reduced through a treatment of reducing risk factors; e.g., lifestyle-improving guidance such as diet guidance, physical exercise guidance, or smoking cessation guidance.

Through employment of two these characteristic biomarkers of the onset of cerebral infarction in combination, risk of the onset of cerebral infarction in a patient of an arteriosclerosis-relating disease (e.g., diabetes or a chronic kidney disease) can be discerned in the short and long terms. Alternatively, by selectively employing a single biomarker focusing on a specific condition or symptom, health expenditure can be saved as compared with the case in which a plurality of biomarkers are employed, and also, risk of the onset of cerebral infarction in a subject can be accurately discerned in accordance with the condition of the subject.

(2) Kit of the Present Invention

An embodiment of the kit of the present invention employs ALPHALISA® as an assay means and includes a set of a GST fusion DIDO1 antigen or a GST fusion CPSF2 antigen (protein), glutathione-conjugated donor beads, and anti-human IgG-conjugated acceptor beads; or a set of a biotinylated DIDO1 antigen or a biotinylated CPSF2 antigen (peptide), streptavidin-conjugated donor beads, and anti-human IgG-conjugated acceptor beads.

Another embodiment of the kit of the present invention employs ELISA as an assay means and includes a set of a plate on which the aforementioned antigen for capturing a humoral antibody has been immobilized, a labeled secondary antibody to the humoral antibody, and a reagent for developing the label of the secondary antibody.

Still another embodiment of the kit of the present invention employs latex agglutination turbidimetry and includes latex particles on which the aforementioned antigen for capturing a humoral antibody has been immobilized.

Yet another embodiment of the kit of the present invention employs CLEIA and includes magnetic particles on which the aforementioned antigen for capturing a humoral antibody has been immobilized, a labeled secondary antibody to the humoral antibody, and a reagent for developing the label of the secondary antibody.

Notably, the aforementioned embodiments of the kit are illustrated merely as examples, and kits employing other assay means are also encompassed in the scope of the kit of the present invention. Furthermore, the number of the aforementioned kit elements may be reduced so as to encourage self-procurement or out-sourcing of medical tests. In contrast, elements such as diluent and reagent tubes can be included in the kit so as to realize immediate use of the kit of the present invention. Other additional elements suited for the mode of tests may also be included.

EXAMPLES

Examples of the present invention will next be described.

Production Examples and Analytical Techniques

<Antigen Proteins and Peptides Employed in the Examples>
(1) Antigen Protein and Peptides In the Examples, the following antigen protein and peptides were used.

(a) DIDO1

"DIDO1 protein" (SEQ ID NO: 3): an N-terminal portion (SEQ ID NO: 3) of 275 amino acids from the GST-modified N terminal in DIDO1 protein (SEQ ID NO: 2)

"DIDO1 peptide" (SEQ ID NO: 4): a 543rd to 560th amino acid sequence (SEQ ID NO: 4) with a biotinylated N-terminal in the aforementioned DIDO1 protein (SEQ ID NO: 2)

FIG. 1 shows an amino acid sequence (SEQ ID NO: 2) of DIDO1 protein represented by single characters. Underlined is a portion corresponding to the amino acid sequence (SEQ ID NO: 4) of DIDO1 peptide employed in the Examples.

(b) CPSF2

"CPSF2 peptide" (SEQ ID NO: 7): a 607th to 620th amino acid sequence (SEQ ID NO: 7) with a biotinylated N-terminal in the full-length protein (SEQ ID NO: 6) encoded by the DNA fragment (SEQ ID NO: 5) of CPSF2

FIG. 2 shows an amino acid sequence (SEQ ID NO: 6) of CPSF2 protein represented by single characters. Underlined is a portion corresponding to an amino acid sequence (SEQ ID NO: 7) of CPSF2 peptide.

(2) Preparation of Antigen Protein and Peptides

The aforementioned antigen protein and peptides were prepared through the following procedure.

(a) Formation and Purification of DIDO1 Protein

A total RNA was extracted from human U2OS osteosarcoma cells by means of High Pure RNA Isolation Kit (Roche, Basel, Switzerland), and cDNA was synthesized by means of Superscript III First-Strand Synthesis System for RT-PCR (Thermo Fisher Scientific). By use of the cDNA as a template, an N-terminal portion (275 amino acids; SEQ ID NO: 3) included in DIDO1 protein (SEQ ID NO: 2) was amplified through PCR by use of Pyrobest DNA polymerase (Takara Bio Inc., Shiga, Japan). The amplified product was inserted into an EcoRI/SalI site of a plasmid vector pGEX-4T-1 (GE Healthcare Life Sciences, Pittsburgh, PA), in which a glutathione S-transferase (GST) gene site is provided on the upstream side of the cloning site, to thereby produce a recombinant plasmid pGEX-4T-1-DIDO1 for gene expression. The nucleotide sequence of the plasmid was characterized through DNA sequencing. *E. coli* BL-21 was transformed by introducing pGEX-4T-1-DIDO1, and expression of DIDO1 CDNA was induced through a treatment with 0.1 mM IPTG (isopropyl-β-D-thiogalactoside) at 25° C. for 4 hours. Thereafter, the pellets of *E. coli* were recovered and dissolved by use of BugBuster Master Mix (Merck Millipore, Darmstadt, Germany), to thereby yield a protein extract. The GST-DIDO1 protein present in the protein extract was purified through column chromatography with glutathione-Sepharose (GE Healthcare Life Sciences). Through changing the buffer to PBS, the aforementioned "DIDO1 protein" was obtained. GST as a control was purified in the same manner.

(b) Designing of Peptides

Antibody recognition sites of CPSF2 protein were retrieved from the disclosed amino acid sequence of CPSF2 protein (SEQ ID NO: 6) by use of an epitope searching site program Propred (www.imtech.res.in/raghava/propred/). As a result, CPSF2-547 to 550, CPSF2-607 to 620, and CPSF2-712 to 725 were selected as candidate epitope sequences. Notably, the amino acid numbers of the candidate epitope sequences selected from SEQ ID NO: 6 refer to a series of amino acids of the amino acid sequence. For example, the numbers 547 to 550 mean a peptide formed of 547th to 550th amino acids of SEQ ID NO: 6. Each of the candidate peptides was synthesized as a peptide with a biotinylated N-terminal through the Fmoc method. Through analysis of the antibody level, CPSF2-607 to 620 (SEQ ID NO: 7) was selected and used as the aforementioned "CPSF2 peptide."

bCPSF2-607: biotin-QVRLKDSLVSSLQFC (SEQ ID NO: 7)

The amino acid sequence (SEQ ID NO: 2) of DIDO1 protein was analyzed in the same manner as employed in the case of CPSF2. As a result, DIDO1-543 to 560, DIDO1-568 to 585, DIDO1-643 to 658, and DIDO1-802 to 819 were selected as candidates. Each of the candidate peptides was synthesized as a crude peptide with a biotinylated N-terminal. Through analysis of the antibody level, "DIDO1-543 to 560, which was most sensitive to cerebral infarction, was selected and used as the aforementioned "DIDO1 peptide." The structure thereof is as follows:

bDIDO1-543: biotin-AMAASKKTAPPGSAVGKQ (SEQ ID NO: 4)

<Analysis Through ALPHALISA®>

Prior to disclosure of specific working examples, the analysis through ALPHALISA® employed in the Examples will next be outlined.

Specifically, the ALPHALISA® (Amplified Luminescence Proximity Homogeneous Assay) was performed by use of a 384-well microtiter plate (white opaque OPTI-PLATE™, Perkin Elmer, Waltham, MA). To each well, a serum (2.5 L) 100-fold diluted with ALPHALISA® buffer (25 mM HEPES, pH: 7.4, 0.1% casein, 0.5% TRITON™ X-100, 1-mg/mL dextran-500, 0.05% Proclin-300) was added. GST, DIDO1 protein (10 µg/mL) (antigen), or biotinylated peptide (DIDO1 peptide or CPSF2 peptide) (antigen) (400 ng/ml), diluted with ALPHALISA® buffer, was mixed with the serum in each well. The mixture was incubated at room temperature for 6 to 8 hours. Separately, anti-human IgG-conjugated acceptor beads (2.5 µL at 40 µg/mL), and glutathione- or streptavidin-conjugated donor beads (2.5 µL at 40 µg/mL) were diluted with ALPHALISA® buffer, and the thus-diluted product was mixed with the incubated product. The resultant mixture was allowed to stand at room temperature for 1 to 14 days. Thereafter, generated photons were counted by means of ENSPIRE® Alpha microplate reader (Perkin Elmer), to thereby determine "Alpha Count." In the case of DIDO1 protein, a control GST value was subtracted, whereas in the case of the biotinylated peptide, a control buffer value was subtracted, whereby antibody levels specific to a CPSF2 antigen or a DIDO1 antigen were determined.

Example 1

Studies of Biomarkers in Transient Ischemic Attack (TIA) Patients and Acute Cerebral Infarction (aCI) Patients Through ALPHALISA®

Acute cerebral infarction (aCI) refers to a pathological condition in which a patient receives sudden damage in motor function and sensory function due to stagnation of blood flow in the brain. Transient ischemic attack (TIA) refers to a disease in which cerebral nerve cells are damaged through the same mechanism as that of cerebral infarction, but the damage is restored within 24 hours, generally several minutes. In both cases, blood serum samples were collected from relevant patients ≤2 weeks after the onset thereof.

In the healthy donors (HD), TIA patients, and aCI patients, the levels of serum antibodies to DIDO1 protein and to CPSF2 peptide were determined through ALPHALISAR. The serum samples of healthy donors were collected from healthy subjects who exhibit no abnormality in brain MRI inspection with the cooperation of Port Square Kashiwado Clinic. The serum samples of the TIA patients and aCI patients were collected from the patients with the cooperation of Chiba Prefectural Sawara Hospital, Chiba Rosai Hospital, Chiba Municipal Aoba Hospital, and Chiba Medical Center.

The results of the investigation are shown in FIG. 3 and Table 1. FIG. 3 shows graphs as mentioned in "Brief Description of the Drawings." Table 1 shows results of the ALPHALISA® data analysis shown in FIG. 3. Table 1 includes (top to down) average of HD samples, SD, cut-off values (average+2SD), total sample number, the number of positive samples exhibiting cut-off value or higher, and positive ratio; averages of samples of TIA patients and aCI patients, SDs, total sample numbers, the number of positive samples exhibiting cut-off value or higher, and positive ratios; and P values (comparison of a patient sample with HD sample). When the P value is ≤0.05, or the positive ratio (%) is ≥10%, the values are bolded.

TABLE 1

| Sample information | HD | TIA | aCI |
|---|---|---|---|
| Total sample number | 123 | 77 | 158 |
| Male/Female | 85/38 | 49/28 | 120/38 |
| Age (Average ± SD) | 51.9 ± 8.7 | 69.6 ± 11.7 | 57.7 ± 7.6 |
| Alpha analysis (antibody level) | | DIDO1-Ab | CPSF2-Ab |
| HD Average | | 13,842 | 2,587 |
| SD | | 5710 | 1,478 |
| Cutoff value | | 25,263 | 5,543 |
| Positive No. | | 0 | 5 |
| Positive (%) | | 0.0% | 4.1% |
| TIA Average | | 17,829 | 3,129 |
| SD | | 5,659 | 2,485 |
| Positive No. | | 9 | 5 |
| Positive (%) | | 11.7% | 6.5% |
| P value (vs HD) | | 3.1.E−06 | 0.086 |
| aCI Average | | 16,471 | 3,210 |
| SD | | 5,914 | 1,733 |
| Positive No. | | 15 | 15 |
| Positive (%) | | 9.5% | 9.5% |
| P value (vs HD) | | 2.0.E−04 | 0.0013 |

As shown in Table 1, when the cut-off value was set to "an average+2SD of HD samples," the positive ratio of the level of the antibody to DIDO1 protein in serum samples of HD, TIA, and aCI were 0.0%, 11.7%, and 9.5%, respectively, and the positive ratio of the level of the antibody to CPSF2 peptide were 4.1%, 6.5%, and 9.5%, respectively. That is, as shown in FIG. 3 and Table 1, the serum levels of the antibodies to DIDO1 protein and to CPSF2 peptide are significantly high in both TIA patients and aCI patients.

Example 2

Studies of Biomarkers in Acute Myocardial Infarction (AMI) Patients and Diabetes Mellitus (DM) Patients Through ALPHALISA®

The level of a serum antibody to DIDO1 protein and the level of a serum antibody to CPSF2 peptide in the AMI patients and DM patients were determined through ALPHALISA®. The determined levels were compared with those of the healthy donors (HD).

FIG. 4 and Table 2 show the results. FIG. 4 shows graphs as mentioned in "Brief Description of the Drawings." Table 2 shows results of the ALPHALISA® data analysis shown in FIG. 4. The items shown in Table 2 are the same as mentioned in relation to Table 1.

TABLE 2

| Sample information | HD | CVD | DM |
|---|---|---|---|
| Total sample number | 128 | 128 | 128 |
| Male/Female | 72/56 | 105/23 | 76/52 |
| Age (Average ± SD) | 58.3 ± 5.6 | 58.2 ± 8.5 | 58.4 ± 9.1 |
| Alpha analysis (antibody level) | | DIDO1-Ab | CPSF2-Ab |
| HD Average | | 11,373 | 5,571 |
| SD | | 1,939 | 2,390 |
| Cutoff value | | 15,251 | 10,351 |
| Positive No. | | 4 | 7 |
| Positive (%) | | 3.1% | 5.5% |
| AMI Average | | 11,634 | 5,343 |
| SD | | 2,405 | 3,070 |
| Positive No. | | 10 | 6 |
| Positive (%) | | 7.8% | 4.7% |
| P (TIA vs HD) | | 0.342 | 0.508 |
| DM Average | | 11,199 | 7,232 |
| SD | | 2,252 | 3,798 |
| Positive No. | | 7 | 17 |
| Positive (%) | | 5.5% | 13.3% |
| P (aCI vs HD) | | 0.508 | 4.1.E−05 |

Based on the above results, no significant difference was observed between the DIDO1 antibody levels of the AMI patients and DM patients, and those of HD (FIG. 4a and Table 2). In contrast, the CPSF2 antibody levels of the DM patients were significantly higher than those of HD, but no significant difference was observed between the CPSF2 antibody levels of the AMI patients and those of the healthy subjects (FIG. 4b and Table 2).

Example 3

Studies of biomarkers in chronic kidney diseases (CKD) patients through ALPHALISA®

The levels of serum antibodies to DIDO1 protein and to CPSF2 peptide in the healthy donors (HD) and CKD patients were determined through ALPHALISAR. The determined levels were compared.

FIG. 5 and Table 3 show the results. FIG. 5 shows graphs as mentioned in "Brief Description of the Drawings." Table 3 shows results of the ALPHALISA® data analysis shown in FIG. 5. The items shown in Table 3 are the same as mentioned in relation to Table 1. Notably, "Type 1-CKD" denotes diabetic nephropathy, "Type 2-CKD" nephrosclerosis, and "Type 3-CKD" glomerulonephropathy.

TABLE 3

| Sample information | HD | Type-1 CKD | Type-2 CKD | Type-3 CKD |
|---|---|---|---|---|
| Total sample number | 82 | 145 | 32 | 123 |
| Male/Female | 44/38 | 106/39 | 21/11 | 70/53 |
| Age (Average ± SD) | 44.1 ± 11.2 | 66.0 ± 10.4 | 76.0 ± 9.8 | 62.0 ± 11.7 |

TABLE 3-continued

| Alpha analysis (antibody level) | | DIDO1-Ab | CPSF2-Ab |
|---|---|---|---|
| HD | Average | 850 | 914 |
| | SD | 572 | 298 |
| | Cutoff value | 1,994 | 1,509 |
| | Positive No. | 4 | 3 |
| | Positive rate (%) | 4.9% | 3.7% |
| Type 1-CKD | Average | 2,189 | 939 |
| | SD | 1,851 | 382 |
| | Positive No. | 49 | 7 |
| | Positive rate (%) | 33.8% | 4.8% |
| | P (vs HD) | 8.8.E−14 | 0.579 |
| Type 2-CKD | Average | 1,982 | 1,020 |
| | SD | 1,140 | 281 |
| | Positive No. | 10 | 2 |
| | Positive rate (%) | 31.3% | 6.3% |
| | P (vs HD) | 4.5.E−06 | 0.081 |
| Type 3-CKD | Average | 1,536 | 936 |
| | SD | 603 | 421 |
| | Positive No. | 21 | 10 |
| | Positive rate (%) | 17.1% | 8.1% |
| | P (vs HD) | 3.7.E−14 | 0.656 |

Based on the above results, the DIDO1 antibody level was significantly higher in all tested types of CKDs than in HD (FIG. 5a and Table 3). The DIDO1 antibody level showed particularly significant difference in the case of Type 1-CKD. In contrast, no significant difference was observed in the CPSF2 antibody level between any CKD and HD (FIG. 5b and Table 3).

Example 4

Results of ROC Analysis

In terms of the above diseases, the serum antibody levels to DIDO1 and CPSF2 determined through ALPHALISA® in Examples 1 to 3 above were further processed through ROC analysis, to obtain areas under the curve (AUC) values, 95% Confidence interval (CI), cut-off values, sensitivity, specificity, and P values, which are shown in Table 4 (Table 4-1: DIDO1, Table 4-2: CPSF2). Tables 4-1 and 4-2 each show data obtained through the ROC analysis, including (top to bottom) AUC, 95% CI, cut-off, sensitivity, specificity, and P values. The description "DIDO1 vs TIA" in Table 4-1 refers to a data column showing "a level of antibody to DIDO1 protein in a serum sample of a TIA patient." The description "DIDO1-pep vs TIA" in Table 4-1 refers to a data column showing "a level of antibody to DIDO1 peptide in a serum sample of a TIA patient." The same convention applies throughout Tables 4-1 and 4-2.

TABLE 4-1

| | DIDO1 vs TIA | DIDO1 vs aCI |
|---|---|---|
| AUC | 0.6819 | 0.6476 |
| 95% CI | 0.5929-0.7709 | 0.5898-0.7053 |
| Cutoff value | 4,509 | 4,686 |
| Sensitivity (%) | 84.1% | 74.1% |
| Specificity (%) | 50.4% | 51.8% |
| P value | 0.00028 | <0.0001 |

| | DIDO1 vs AMI | DIDO1 vs DM |
|---|---|---|
| AUC | 0.5163 | 0.5347 |
| 95% CI | 0.4454-0.5875 | 0.4638-0.6057 |
| Cutoff value | 13,519 | 10,700 |
| Sensitivity (%) | 22.7% | 46.9% |
| Specificity (%) | 85.8% | 63.8% |
| P value | 0.650 | 0.338 |

TABLE 4-1-continued

| | DIDO1 vs Type-1 CKD | DIDO1 vs Type-2 CKD | DIDO1 vs Type-3 CKD |
|---|---|---|---|
| AUC | 0.9046 | 0.8956 | 0.8517 |
| 95% CI | 0.8564-0.9507 | 0.8393-0.9518 | 0.7926-0.9109 |
| Cutoff value | 904 | 950.5 | 905.5 |
| Sensitivity (%) | 98.6% | 96.9% | 91.9% |
| Specificity (%) | 72.0% | 73.2% | 72.0% |
| P value | <0.0001 | <0.0001 | <0.0001 |

| | DIDO1-pep vs TIA | DIDO1-pep vs aCI |
|---|---|---|
| AUC | 0.6503 | 0.6611 |
| 95% CI | 0.5751-0.7256 | 0.6138-0.7084 |
| Cutoff value | 4,662 | 8,413 |
| Sensitivity (%) | 87.9% | 43.9% |
| Specificity (%) | 38.3% | 81.9% |
| P value | 0.0003 | <0.0001 |

TABLE 4-2

| | CPSF2 vs TIA | CPSF2 vs aCI |
|---|---|---|
| AUC | 0.6314 | 0.6369 |
| 95% CI | 0.5631-0.6997 | 0.5970-0.6768 |
| Cutoff value | 2,643 | 2,644 |
| Sensitivity (%) | 54.4% | 57.8% |
| Specificity (%) | 67.7% | 67.7% |
| P value | 0.0002 | <0.0001 |

| | CPSF2 vs AMI | CPSF2 vs DM |
|---|---|---|
| AUC | 0.5522 | 0.6464 |
| 95% CI | 0.4817 to 0.6226 | 0.5792 to 0.7136 |
| Cutoff value | 5,356 | 6,145 |
| Sensitivity (%) | 63.3% | 55.5% |
| Specificity (%) | 49.2% | 70.3% |
| P value | 0.149 | <0.0001 |

| | CPSF2 vs Type-1 CKD | CPSF2 vs Type-2 CKD | CPSF2 vs Type-3 CKD |
|---|---|---|---|
| AUC | 0.5040 | 0.6387 | 0.5196 |
| 95% CI | 0.4262-0.5817 | 0.5274-0.7500 | 0.4395-0.5996 |
| Cutoff value | 641.5 | 901 | 706 |
| Sensitivity (%) | 11.7% | 65.6% | 29.3% |
| Specificity (%) | 93.9% | 62.2% | 80.5% |
| P value | 0.921 | 0.022 | 0.635 |

As shown Table 4-1, the serum antibody level to DIDO1 protein exhibited a remarkably high AUC value with respect to CKD and significantly high AUC values with respect to TIA and aCI. The serum antibody level to DIDO1 protein exhibited almost the same (no significant difference) AUC values with respect to AMI and DM. Similarly, the serum antibody level to DIDO1 peptide exhibited high AUC values with respect to TIA and aCI.

As shown Table 4-2, the serum antibody level to CPSF2 peptide exhibited high AUC values with respect to TIA, aCI, and DM. However, the serum antibody level to CPSF2 peptide exhibited almost the same (no significant difference) AUC values with respect to AMI, Type 1-CKD, and Type 3-CKD, and a less significantly different AUC value with respect to Type 2-CKD.

Example 5

Correlation Analysis Between Serum Antibody Level and Test Subject Data (1) Mann-Whitney U Analysis Next, the serum antibody levels to DIDO1 peptide and CPSF2 peptide and data of the test subjects were processed through Mann-Whitney U analysis (test for identify of population distributions on two non-related data groups).

Specifically, 851 serum samples were collected from subjects in Chiba Prefectural Sawara Hospital. The serum antibody levels to antigens; i.e., DIDO1 peptide and CPSF2 peptide, were determined through ALPHALISA®. Mann-Whitney U analysis was performed between the obtained measurements and the data of the test subjects.

The data of the test subjects were divided into groups on the basis of the following parameters: sex; current symptoms [none (HD), deep and subcortical white matter hyperintensity (DSWMH), asymptomatic cerebral infarction (asympt-CI), TIA, aCI, chronic cerebral infarction (cCI), diabetes mellitus (DM), hypertension (HT), cardiovascular disorder (CVD), and lipidemia], and lifestyle (smoking habit and drinking habit).

The results are shown in Table 5 (Table 5-1, Table 5-2, and Table 5-3). Each of Tables 5-1, 5-2, and 5-3 shows sample number of each group, averages and SD of the serum antibody levels (Alpha counts) to the DIDO1 peptide antigen and the CPSF2 peptide antigen, and P values obtained through Mann-Whitney U analysis of each group and a control group.

TABLE 5-1

| Present disease | | HD | DSWMH | asympt-CI | TIA | aCI | cCI |
|---|---|---|---|---|---|---|---|
| Sample number | | 188 | 162 | 18 | 66 | 351 | 66 |
| DIDO1pep-Ab level | Average | 3,381 | 3,523 | 3,481 | 4,443 | 4,688 | 4,347 |
| | SD | 1,660 | 1,750 | 2,099 | 2,576 | 2,740 | 3,017 |
| P value (vs HD) | | — | 0.4379 | 0.8467 | 0.0024 | 1.64E−11 | 0.0156 |
| CPSF2-Ab level | Average | 7,322 | 7,571 | 8,312 | 11,778 | 8,722 | 10,088 |
| | SD | 3,415 | 2,942 | 2,461 | 16,843 | 3,970 | 4,240 |
| P value (vs DM−) | | | 0.1626 | 0.0220 | 0.0024 | <0.0001 | <0.0001 |

| Other disease | | DM− | DM+ |
|---|---|---|---|
| Sample number | | 732 | 180 |
| DIDO1pep-Ab level | Average | 4,059 | 4,047 |
| | SD | 2,469 | 2,027 |
| P value (vs DM−) | | | 0.9488 |
| CPSF2-Ab level | Average | 8,319 | 9,437 |
| | SD | 5,373 | 7,822 |
| P value (vs DM−) | | | 0.0153 |

| Other disease | | HT− | HT+ |
|---|---|---|---|
| Sample number | | 347 | 565 |
| DIDO1pep-Ab level | Average | 3,830 | 4,196 |
| | SD | 2,217 | 2,477 |
| P value (vs HT−) | | | 0.0212 |
| CPSF2-Ab level | Average | 7,699 | 9,065 |
| | SD | 6,095 | 5,804 |
| P value (vs HT−) | | | <0.0001 |

TABLE 5-2

| Other disease | | CVD− | CVD+ |
|---|---|---|---|
| Sample number | | 861 | 51 |
| DIDO1pep-Ab level | Average | 4,003 | 4,966 |
| | SD | 2,360 | 2,673 |
| P value (vs CVD−) | | | 0.0148 |
| CPSF2-Ab level | Average | 8,499 | 9,232 |
| | SD | 6,037 | 4,239 |
| P value (vs CVD−) | | | 0.1419 |

| Other disease | | Lipidemia− | Lipidemia+ |
|---|---|---|---|
| Sample number | | 649 | 263 |
| DIDO1pep-Ab level | Average | 4,158 | 3,806 |
| | SD | 2,497 | 2,073 |
| P value (vs Lipidemia−) | | | 0.0292 |
| CPSF2-Ab level | Average | 8,146 | 9,531 |
| | SD | 3,583 | 9,534 |
| P value (vs Lipidemia−) | | | 0.1446 |

| Sex | | Male | Female |
|---|---|---|---|
| Sample number | | 528 | 389 |
| DIDO1pep-Ab level | Average | 4,081 | 4,038 |
| | SD | 2,493 | 2,244 |
| P value (vs Male) | | | 0.7807 |
| CPSF2-Ab level | Average | 8,633 | 8,420 |
| | SD | 5,493 | 6,553 |
| P value (vs Male) | | | 0.1549 |

TABLE 5-3

| Life style | | Non-smoker | Smoker |
|---|---|---|---|
| Sample number | | 474 | 441 |
| DIDO1pep-Ab level | Average | 3,732 | 4,425 |
| | SD | 2,037 | 2,676 |
| P value (vs non-smoker) | | | 1.33E−05 |
| CPSF2-Ab level | Average | 8,214 | 8,901 |
| | SD | 6,086 | 5,801 |

TABLE 5-3-continued

| P value (vs non-smoker) | | | 0.0019 |
|---|---|---|---|
| Life style | | Alcohol− | Alcohol+ |
| Sample number | | 334 | 581 |
| DIDO1pep-Ab level | Average | 4,001 | 4,103 |
| | SD | 2,236 | 2,476 |
| P value (vs Alcohol−) | | | 0.5270 |
| CPSF2-Ab level | Average | 8,559 | 8,591 |
| | SD | 6,946 | 5,341 |
| P value (vs Alcohol−) | | | 0.3614 |

As shown in Tables 5-1, 5-2, and 5-3, the serum antibody level to DIDO1 peptide antigen exhibited the highest value with respect to aCI, which is similar to the case of the serum antibody level to DIDO1 protein antigen. The serum antibody level to DIDO1 peptide antigen exhibited significantly high values with respect to TIA and cCI. Also, the antibody level was found to be significantly correlated with hypertension, cardiovascular disorder, and lipidemia, but not correlated with diabetes and sex. In addition, regarding lifestyle factors, the antibody level was found to be significantly correlated with smoking habit, but not correlated with drinking habit.

In contrast, the serum antibody level to CPSF2 peptide antigen exhibited remarkably high values with respect to aCI and cCI and significantly high values with respect to TIA and asympt-CI. Therefore, the antibody to CPSF2 can be estimated to recognize subtle abnormality in relation to cerebral infarction. Other than the aforementioned diseases, the serum antibody level to CPSF2 peptide antigen exhibited a response to DM and HT, but not substantially (no significance) to lipidemia and CVD. Regarding lifestyle factors, the antibody level was found to be correlated with smoking habit, but not correlated with drinking habit.

(2) Spearman's Correlation Analysis

Next, the serum antibody levels to DIDO1 peptide and CPSF2 peptide in 917 serum samples (collected from Chiba Prefectural Sawara Hospital) and data of the test subjects were processed through Spearman's correlation analysis (analysis for numerically evaluating rank correlation between two variables (linear relationship: monotonic increase or monotonic decrease)). The data of the test subjects employed include the following: age, body height, body weight, body mass index (BMI), maximum intima-media thickness (max IMT), blood test data [albumin/globulin ratio (A/G), aspartate aminotransferase (AST), alanine aminotransferase (ALT), alkaline phosphatase (ALP), lactate dehydrogenase (LDH), total bilirubin (tBil), cholinesterase (CHE), γ-glutamyl transpeptidase (γ-GTP), total protein (TP), albumin (ALB), blood urea nitrogen (BUN), creatinine (CRE), estimated glomerular filtrating ratio (eGFR), uric acid (UA), amylase (AMY), total cholesterol (T-CHO), HDL-cholesterol (HDL-C), triglyceride (TG), sodium (Na), potassium (K), chlorine (Cl), calcium (Ca), inorganic phosphate (IP), iron (Fe), C-reactive protein (CRP), LDL-cholesterol (LDL-C), white blood cell (WBC), red blood cell (RBC), hemoglobin (HGB), hamatocrit (HCT), mean corpuscular volume (MCV), mean corpuscular hemoglobin (MCH), mean corpuscular hemoglobin concentration (MCHC), red cell distribution width (RDW), platelet (PLT), mean platelet volume (MPV), procalcitonin (PCT), platelet distribution width (PDW), blood sugar (BS), and glycated hemoglobin (HbA1c)], blood pressure (BP), and smoking period (years).

Table 6 (Tables 6-1 and 6-2) shows the results of the correlation analysis of the serum antibody levels to a DIDO1 peptide antigen and a CPSF2 peptide antigen and the above data of the test subjects (917 serum samples collected from Chiba Prefectural Sawara Hospital). In the Tables, there are provided the number of samples in each group, and rank correlation coefficient (r) and P value of the serum antibody levels (Alpha counts) to DIDO1 peptide antigen and CPSF2 peptide antigen obtained through Spearman's correlation analysis.

TABLE 6-1

| Data | | DIDO1pep-Ab | | CPSF2pep-Ab | |
|---|---|---|---|---|---|
| Parameter | number of XY Pairs | Spearman r | P value | Spearman r | P value |
| Age | 851 | 0.2074 | <0.0001 | 0.1657 | <0.0001 |
| Height | 844 | −0.1227 | 0.0004 | −0.0799 | 0.0202 |
| Weight | 848 | −0.1047 | 0.0023 | −0.0707 | 0.0396 |
| BMI | 843 | −0.0311 | 0.3679 | −0.0343 | 0.3197 |
| max IMT | 646 | 0.1908 | <0.0001 | 0.2161 | <0.0001 |
| A/G | 820 | −0.0303 | 0.3858 | −0.0906 | 0.0094 |
| AST (GOT) | 848 | 0.0605 | 0.0782 | −0.0496 | 0.1490 |
| ALT (GPT) | 847 | 0.0063 | 0.8545 | −0.0800 | 0.0199 |
| ALP | 786 | 0.0850 | 0.0172 | 0.0319 | 0.3716 |
| LDH | 822 | 0.0718 | 0.0395 | −0.0134 | 0.7017 |
| tBil | 830 | −0.0576 | 0.0972 | −0.1024 | 0.0031 |
| CHE | 646 | −0.0895 | 0.0230 | −0.0982 | 0.0125 |
| γ-GTP | 795 | 0.0334 | 0.3474 | −0.0028 | 0.9381 |
| TP | 823 | −0.0971 | 0.0053 | −0.1084 | 0.0018 |
| ALB | 832 | −0.0757 | 0.0289 | −0.1358 | <0.0001 |
| BUN | 846 | 0.0179 | 0.6038 | −0.0381 | 0.2686 |
| Creatinin | 842 | −0.0090 | 0.7946 | −0.0341 | 0.3233 |
| eGFR | 758 | 0.0176 | 0.6284 | 0.0230 | 0.5282 |
| UA | 622 | 0.0336 | 0.4023 | 0.0050 | 0.9006 |
| AMY | 527 | −0.0780 | 0.0735 | −0.0391 | 0.3701 |
| T-CHO | 744 | −0.0520 | 0.1568 | −0.1207 | 0.0010 |
| HDL-c | 550 | −0.0458 | 0.2840 | 0.0553 | 0.1952 |
| TG | 589 | 0.0199 | 0.6303 | −0.0405 | 0.3261 |
| Na | 833 | 0.0200 | 0.5635 | 0.0005 | 0.9881 |
| K | 832 | −0.0275 | 0.4280 | −0.0072 | 0.8359 |
| Cl | 833 | 0.0056 | 0.8708 | 0.0269 | 0.4376 |
| Ca | 495 | −0.0210 | 0.6408 | −0.0405 | 0.3682 |
| IP | 388 | −0.0023 | 0.9639 | 0.0546 | 0.2836 |
| Fe | 400 | −0.0406 | 0.4185 | −0.0472 | 0.3465 |
| CRP | 617 | 0.1172 | 0.0035 | 0.1041 | 0.0096 |

TABLE 6-2

| Data | | DIDO1pep-Ab | | CPSF2pep-Ab | |
|---|---|---|---|---|---|
| Parameter | number of XY Pairs | Spearman r | P value | Spearman r | P value |
| LDL-C | 440 | −0.0513 | 0.2831 | −0.1180 | 0.0133 |
| WBC | 846 | 0.1036 | 0.0026 | 0.0417 | 0.2262 |
| RBC | 846 | −0.0426 | 0.2155 | −0.0711 | 0.0386 |
| HGB | 846 | −0.0113 | 0.7420 | −0.0672 | 0.0508 |
| HCT | 846 | −0.0078 | 0.8214 | 0.0528 | 0.1249 |
| MCV | 846 | 0.0683 | 0.0472 | 0.0510 | 0.1387 |
| MCH | 846 | 0.0474 | 0.1681 | 0.0081 | 0.8136 |
| MCHC | 846 | −0.0149 | 0.6659 | −0.0617 | 0.0728 |
| RDW | 846 | 0.0489 | 0.1551 | 0.0529 | 0.1245 |
| PLT | 846 | −0.0047 | 0.8919 | 0.0128 | 0.7097 |
| MPV | 846 | −0.0201 | 0.5589 | −0.0012 | 0.9716 |
| PCT | 846 | −0.0030 | 0.9312 | 0.0188 | 0.5853 |
| PDW | 846 | −0.0151 | 0.6611 | −0.0109 | 0.7512 |
| BS | 783 | 0.0834 | 0.0195 | 0.0644 | 0.0718 |
| HbA1c | 655 | −0.0204 | 0.6031 | −0.0277 | 0.4789 |
| BP Smoking | 824 | 0.1106 | 0.0015 | 0.0593 | 0.0889 |
| period (year) | 842 | 0.1836 | <0.0001 | 0.1486 | <0.0001 |

As shown in Tables 6-1 and 6-2, Spearman's correlation analysis has revealed that the serum antibody level to DIDO1 and that to CPSF2 are both in correlation with age, max IMT, CRP, and smoking period, and in inverse correlation with body height, body weight, ALB, and TP. Also, the serum antibody level to DIDO1 is in correlation with BP, whereas the serum antibody level to CPSF2 is in inverse correlation with A/G, ALT, tBIL, T-CHO, and LDL-C. Thus, conceivably, the serum antibody biomarkers to DIDO1 and CPSF2 correlate with age, IMT, and smoking habit and reflect arteriosclerosis. Also, the serum antibody biomarker to DIDO1 may reflect hypertension, and the serum antibody biomarker to CPSF2 may reflect a decrease in blood protein level and a decrease in blood cholesterol level.

Example 6

Multipurpose Cohort Sample Analysis

The analysis was targeted toward about 30,000 subjects who participate in a multipurpose cohort research project (JPHC: Japan Public Health Center-based Cohort Study) and whose plasma samples were stored. The subjects were selected from men and women of 40 to 69 years who lived in 9 jurisdictions of public health centers (i.e., Ninohe (Iwate), Yokote (Akita), Saku (Nagano), Chubu (Okinawa), Mito (Ibaraki), Nagaoka (Niigata), Chuou Higashi (Kochi), Kamigotou (Nagasaki), and Miyako (Okinawa)) in 1990 and 1993.

The subjects were divided into a "case group" and a "control group." The subjects of the case group exhibited the onset of acute cerebral infarction (aCI) from the start of the survey to 2008, and the subjects of the control group were alive in the same period without the onset of aCI. Each case was matched in terms of sex, age, and living area, and a corresponding control was selected at random. As a result, 202 cases and 202 controls were characterized. In each case, the plasma antibody levels to DIDO1 antigens (DIDO1 protein and DIDO1 peptide) and to a CPSF2 antigen (CPSF2 peptide) were determined through ALPHALISAR. The relationship between each antibody level (quartile) and the onset of aCI was analyzed through a conditional logistic model.

Table 7 shows the results.

TABLE 7

| | | DIDO1 vs aCI | DIDO1-pep vs aCI | CPSF2 vs aCI |
|---|---|---|---|---|
| 2nd | Matched OR | 3.99 | 1.92 | 1.19 |
| | 95% CI | 1.93-8.23 | 1.03-3.58 | 0.63-2.23 |
| 3rd | Matched OR | 3.40 | 2.40 | 1.66 |
| | 95% CI | 1.62-7.13 | 1.29-4.46 | 0.89-3.09 |
| Max | Matched OR | 4.02 | 2.66 | 2.41 |
| | 95% CI | 1.94-8.35 | 1.43-4.95 | 1.33-4.37 |

The plasma antibody level to DIDO1 protein was found to be strongly correlated with the onset of aCI. With respect to the lowest antibody level group, the conditional odds ratios of the aCI onset were 3.99 (1.93-8.23) (95% confidence intervals) at the second quartile, and 3.40 (1.62-7.13) at the third quartile. In the highest antibody level group, the conditional odds ratio was 4.02 (1.94-8.35). The results regarding the plasma antibody level to DIDO1 peptide were the same as those of the case of the DIDO1 protein antigen, but the odds ratios were slightly lower. Also, the plasma antibody level to CPSF2 peptide was found to be correlated with the onset of aCI, and the conditional odds ratios of the aCI onset were 1.19 (0.63-2.23), 1.66 (0.89-3.09), and 2.41 (1.33-4.37). Thus, the humoral antibody levels to DIDO1 and CPSF2 were found to serve as biomarkers useful for predicting the onset of aCI.

SUMMARY OF THE EXAMPLES

The humoral (serum or plasma) antibody level to DIDO1 is high in the body fluid samples of the patients of TIA, aCI, and CKD. No significant rise in the antibody level is observed in the body fluid samples of the patients of AMI and DM.

Particularly, since the humoral antibody level to DIDO1 exhibits an AUC greater than 0.8 in the case of CKD, the antibody level can be evaluated as a biomarker suitably responsive to kidney failure and hypertension. Also, since the humoral antibody level to DIDO1 is more responsive to aCI than to cCI and TIA among cerebral infarction types, the level can distinguish those who develop aCI from kidney failure. Furthermore, since the humoral antibody level to DIDO1 is not responsive to asympt-CI, the antibody level can serve as a biomarker which steeply rises immediately before the onset of acute-stage cerebral infarction. If a subject exhibits a high level of this biomarker, the subject is considered to have an imminent risk of the onset of cerebral infarction. Thus, the subject must receive immediate prophylactic actions such as treatment of a kidney disease and controlling of blood pressure.

Since the humoral antibody level to DIDO1 drops in the case of cCI, the antibody level may be employed for post-treatment monitoring of cerebral infarction.

In contrast, the humoral antibody level to CPSF2 is not sharply responsive to CKD but is sufficiently responsive to AMI, DM, aCI, and TIA. Particularly, the antibody can be employed to differentiate aCI from AMI, in the case where DM is an underlying disease. No correlation is observed between the humoral antibody level to CPSF2 and HbA1c and BS, serving as biomarkers for DM. A conceivable reason for this is that many DM patients exhibit low DM biomarker levels by virtue of a relevant treatment. Thus, even if DM biomarkers are low, when the humoral antibody level to CPSF2 is high, reduction in the risk of the onset of cerebral infarction would not be evaluated. In addition, even if total blood protein and albumin levels decrease, when this biomarker is high, reduction in the risk of the onset of cerebral infarction would not be evaluated.

The body fluid samples of the aCI patients were sampled ≤2 weeks after the onset of cerebral infarction. The likelihood of emergence of a new autoantibody after the onset is considerably low. Therefore, the humoral antibodies to DIDO1 and CPSF2 are considered to be present before the onset of cerebral infarction. Thus, these antibodies may also serve as biomarkers for predicting the onset of arteriosclerosis.

In the aforementioned specific JPHC cohort sample analysis, the humoral antibody levels to DIDO1 and to CPSF2 are significantly high in the subjects with the onset of aCI. Thus, the humoral antibody levels to DIDO1 and to CPSF2 can serve as biomarkers useful for predicting cerebral infarction.

As described above, the humoral antibody level to DIDO1 and the humoral antibody level to CPSF2 corresponds to different underlying diseases, specifically, a kidney disease and diabetes mellitus, respectively. In other words, these biomarkers can discern a candidate having possibility of the onset of cerebral infarction among patients of underlying diseases such as a kidney disease and diabetes mellitus. Furthermore, when the humoral antibody level to DIDO1 and the humoral antibody level to CPSF2 are employed in combination as a biomarker, people with a high risk of the onset of cerebral infarction caused from various underlying diseases can be detected.

More specifically, the humoral antibody level to CPSF2 gradually rises in the progression from Asympt-CI or TIA (i.e., preliminary stage of aCI) to aCI. The humoral antibody level to DIDO1 steeply rises immediately before aCI. If the two biomarkers are assessed in combination, the degree of the onset risk of cerebral infarction can be estimated. Furthermore, determination of these biomarkers can realize prediction of the cause of diabetes mellitus, a kidney disease, etc. The thus-determined high-risk subjects will need immediate prophylactic actions depending on the cause thereof.

INDUSTRIAL APPLICABILITY

Cerebral infarction is a top cause of being bedridden, and prevention of the onset thereof through prediction of the onset will be of great social value. The data acquisition method of the present invention and the kit of the present invention for carrying out the data acquisition method enable detection of the onset risk of cerebral infarction generally or in a symptom-specific manner, whereby appropriate prophylactic and therapeutic treatments can be carried out in accordance with any situation. Thus, the present invention is of great value in the industry.

The entirety of the disclosure of Japanese Patent Application No. 2017-230639 (filing date: Nov. 30, 2017) is incorporated herein by reference. All the documents, patent applications, and technical standards disclosed herein are incorporated herein by reference to the same extent as if each individual document, patent application, technical standard is specifically and individually indicated to be incorporated by reference.

The invention claimed is:

1. A method for detecting an increased level of anti-death-inducer obliterator 1 (DIDO1) antibody in a subject, said method comprising detecting, in a body fluid sample from a test subject before onset of acute cerebral infarction, an increased amount of anti-DIDO1 antibody as compared to that of a healthy subject, wherein said anti-DIDO1 antibody is able to bind to a peptide consisting of the amino acid sequence of SEQ ID NO: 4.

2. The method according to claim 1, wherein the increased amount of anti-DIDO1 antibody is detected in the sample from the test subject with a chronic kidney disease.

3. The method according to claim 1, wherein said detecting the increased amount of anti-DIDO1 antibody comprises contacting said sample with a peptide comprising the amino acid sequence of SEQ ID NO: 4, and when said sample contains an antibody that binds to said peptide, binding between the antibody and the peptide is detected as a signal.

4. The method according to claim 1, wherein the sample is a blood sample.

5. The method according to claim 1, wherein the sample is a serum sample or a plasma sample.

6. The method according to claim 1, wherein the increased amount of the anti-DIDO1 antibody is determined through Enzyme-Linked Immunoassay (ELISA), indirect immunofluorescence, Western blotting (immunoblotting), turbidimetry, nephelometry, latex-coagulation turbidimetry, or Chemiluminescent Enzyme Immunoassay (CLEIA).

\* \* \* \* \*

SEQUENCE LISTING

```
<160> NUMBER OF SEQ ID NOS: 7

<210> SEQ ID NO 1
<211> LENGTH: 8592
<212> TYPE: DNA
<213> ORGANISM: Homo sapiens

<400> SEQUENCE: 1
gtacttgcgc agaactcccc tcgcggcgac cacgcactac gggttggcgc cagagtcaaa        60
aggcgtcggc cctctggcaa gatggctgct gcggaggcgt tggagcgcgg aaatctggaa       120
ccgggatggc gacgtctaca ctgagtcgga ggcgaaggag cttactccac gggaacagcc       180
tctagataat ctgagttgtt gaaaatacga agcctgttac tcgtgaacag tggctgacaa       240
cagtgttgtt gtgagcctgg ctgtctgctt ggacccagag gtttcgtctg ccagggtttt       300
tggttgtatt taggatttca gggaaaagtg tccaagcttt cagtgttgga gcaggtatgg       360
acgacaaagg cgacccgagc aatgaggagg cacctaaggc catcaaaccc accagcaaag       420
agttcaggaa aacatggggt tttcgaagga ccactatcgc caagcgagag ggcgcagggg       480
acgcggaggc tgacccactg gagccgccac ccccacagca gcagctgggc ctgtccctgc       540
ggcgcagtgg gaggcagccc aagcgcactg agcgcgtgga gcagttcctg accattgcgc       600
ggcgccgcgg caggaggagc atgcctgtct ccctggagga ttctggtgag cccacgtcct       660
gccccgccac agacgccgag acagcctccg agggcagcgt ggaaagcgct tctgagacca       720
gaagcggccc ccagtctgct tccacagctg tgaaggaacg accagcctct tctgaaaagg       780
tgaaaggagg ggatgaccac gatgacacct ccgatagtga cagcgatggc ctgaccttga       840
aagagcttca gaatcgcctt cgcaggaagc gggaacagga gcccactgag aggcccctga       900
aagggatcca gagtcgcctg cggaagaagc gcgggagga gggtcccgcc gagactgtgg       960
gctccgaggc cagtgacact gtggagggcg tcctgcccag taagcaggag cccgagaacg      1020
atcagggggt tgtgtcccag gctgggaaag atgacagaga gagtaagttg gagggaaagg      1080
cggctcagga catcaaagat gaggagcctg gagacttggg ccgaccgaag cctgaatgtg      1140
agggttacga ccccaacgcc ctgtattgca tttgccgcca gcctcacaac aacaggttta      1200
tgatttgctg tgaccgctgt gaagaatggt ttcatgcgca ttgtgtgggc atttctgagg      1260
ctcgagggag gcttttggaa aggaatgggg aagactatat ctgcccaaac tgcaccattc      1320
tgcaagtgca ggatgagact cattcagaaa cggcagatca gcaggaagct aaatggagac      1380
ctggagatgc tgatggcacc gattgtacaa gtataggaac aatagagcag aagtctagcg      1440
```

-continued

```
aagaccaagg gataaagggt agaattgaga aagctgcaaa tccaagtggc aagaagaaac    1500
tcaagatctt ccagcctgtg atagaggcgc ctggtgcctc aaaatgtatt ggccccgggt    1560
gctgtcacgt ggcgcagccc gactcggtgt actgcagtaa tgactgtatc ctcaaacacg    1620
ccgcagcgac aatgaagttt ctaagctcag gtaaagaaca gaagccaaag cctaaagaaa    1680
agatgaagat gaagccagag aagcccagtc ttccgaaatg cggtgctcag gcaggtatta    1740
aaatctcttc tgtgcacaag agaccagctc cagaaaaaaa agagaccaca gtgaagaagg    1800
cagtggtggt ccctgcgcgg agtgaagcac tcgggaagga agcagcttgt gagagcagca    1860
cgccgtcgtg ggcgagcgat cacaattaca atgcagtaaa gccagaaaag actgctgctc    1920
cctcgccgtc actgttgtat aaatccacga aggaagacag gaggtccgag gagaaagcgg    1980
cagccatggc agcctcaaag aaaacagccc ctccaggctc cgcggtgggc aagcagcctg    2040
cacctagaaa cctcgtgcca aagaagtctt cttttgctaa tgtggcagca gccacaccag    2100
ccattaaaaa gccaccctca ggtttcaagg gcaccatccc caagaggcca tggctctccg    2160
ctaccccatc gagtggtgct tcagctgcca ggcaggccgg accggcacct gcagcggcaa    2220
cggctgcctc caagaagttc cctggctccg ctgctttggt gggagccgta aggaagccag    2280
tggtaccttc tgttccaatg gcctcgccag ccccaggacg ccttggggct atgagtgctg    2340
caccatcgca gccaaattca caaattcggc aaaatatcag acgctcctta aaagagattt    2400
tgtggaaaag agtcaatgac agcgatgact taatcatgac agaaaacgaa gtaggaaaaa    2460
ttgccctcca tattgagaag gagatgttta acttgtttca agttacagat aatcgctaca    2520
agagtaaata tcgcagcatc atgttcaacc tgaaggaccc taaaaatcag ggactcttcc    2580
atcgtgttct gcgtgaggaa atctcttttgg cgaaacttgt gagactgaag ccagaagaac    2640
ttgtatctaa agagctttcc acgtggaaag agaggccagc gagatctgtg atggagtcca    2700
gaactaaact gcacaatgaa agcaagaaga cggcccccag gcaggaggcc atccccgatc    2760
tggaggactc tccgccagtg tcggattcag aggaacagca agagtcagca cgtgctgtcc    2820
ctgagaagag cacagcgccg cttctcgacg tcttcagcag catgttgaaa gacaccacca    2880
gtcagcaccg cgcacacctc ttcgatctca actgtaaaat ttgcacaggc caggttccct    2940
ccgcagaaga tgagccagct ccgaaaaaac aaaaattgtc agcttctgtt aagaaagaag    3000
acttaaaatc aaagcatgac agctctgcac ctgacccagc tccggattca gctgatgagg    3060
tgatgccgga ggctgtgcct gaagttgcct ctgagccagg cctagaaagt gcttctcatc    3120
caaatgtgga cagaacgtat ttccctgggc ctccaggaga tggccatccc gagccctccc    3180
cgctggaaga cctgtccccc tgcccagcct cctgtgggag cggggtggtc accaccgtca    3240
cagtgtccgg ccgggacccc aggaccgctc aagcagttc atgcacagcc gtggcctccg    3300
cagcatcccg cccagacagc acccacatgg tggaagccag acaggatgtg ccgaagcctg    3360
tcttgacttc tgtgatggtg cccaagtcca tactagctaa gccatcctca tctcctgacc    3420
caagatacct gtcagttcct ccgtcaccaa atatcagcac ttcagaatca cgttcccctc    3480
cagagggaga cacgaccctc tttttgtctc gactcagcac catttggaaa ggatttatta    3540
acatgcagag tgtggcaaaa tttgtcacta aggcgtatcc tgtctctggg tgttttgatt    3600
acctcagtga ggatttgcct gacacaattc acattggtgg gaggatcgca ccgaagacag    3660
tttgggatta tgttggcaaa ctcaagtctt ctgtgtctaa ggagctctgt ctgatccgct    3720
tccaccccgc cacagaggaa gaggaggtcg cctatatctc tctctactcc tatttcagca    3780
gccgtggccg cttttggtgtt gtagctaata acaacaggca cgtcaaggac ctctacctga    3840
```

```
tcccgctgag cgcccaggac cctgttccat ccaaactctt gccctttgag ggaccaggtc    3900
ttgagtcacc acgtccgaat ataattcttg ggttagtaat ctgccaaaaa atcaaacgtc    3960
ccgcaaacag tggagagtta gacaagatgg acgaaaagcg gacccgactt caaccggaag    4020
aagcggacgt tccggcctat ccaaaagtag ccacagtccc gcagtcggaa aagaagccct    4080
ccaagtatcc actctgctct gcagacgcgg ctgtcagcac cacacctcct gggtcgccgc    4140
cgcctccgcc ccctcttcca gaaccaccgg tgctaaaagt gctgtcatcc ctcaaacctg    4200
cagcccccag cccagccaca gcagccacaa cagcagcggc agcctccacg gcagcttcct    4260
ccaccgcttc gtctgcttcc aaaacagcat caccgctgga gcacatcctg cagactctct    4320
ttggaaagaa gaaatcattc gacccgtccg ccagagagcc tcccgggtcc accgcaggtc    4380
tcccccagga gcccaaaacc acagcagagg acggggtgcc ggcacctccg ttgttagatc    4440
cgatcgtcca gcagttcggt cagttctcaa aagataaggc tctagaggaa gaggaggacg    4500
acaggccata cgaccctgag gaggagtacg acccggagag ggccttcgac actcagcttg    4560
tggagcgagg gcggcgccac gaggtggaaa gggctcctga agcagctgca gccgagcggg    4620
aagaggtggc ctatgacccc gaggatgaga ccatcttaga agaagcgaaa gtgactgttg    4680
atgacctgcc caacaggatg tgtgccgacg tgagaaggaa ctccgtggag aggcctgccg    4740
agccggtggc cggggctgcg acgccctccc tggtggagca acagaagatg ctagaagagc    4800
tgaacaaaca gatcgaggag cagaagagac agctggagga gcaagaagaa gctctcaggc    4860
agcagagggc cgccgtcggg gtctccatgg cccacttctc ggtgtcggac gccttgatgt    4920
ctccaccacc aaagtcgtcc ttgcccaagg cagagctgtt ccagcaagag cagcagtctg    4980
cagacaagcc cgcctcactg ccccccgcca gccaggcgtc aaaccacagg acccccggc     5040 aggcgaggcg cctggccact gagaccggtg aggggagggg ggagcctctc tccaggctct    5100
cggcacgtgg tgcccagggt gccctgcccg agagagatgc ttccagggt ggcctcgtgg     5160 gccaggcgcc catgccagtc ccggaggaaa aagagccagc ctcttccccc tgggcttcgg    5220
gcgaaaagcc cccagcgggg tccgagcagg acggctggaa ggcagagcct ggggagggca    5280
cccgccccgc cacggttgga gacagctcgg ccaggcctgc ccggagggtg ctgctgccca    5340
caccgccttg cggcgccctg cagcccggct tcccgctgca gcacgacggt gagagggacc    5400 cttttcacctg cccggggttc gcgtcgcagg acaaggctct cggctcagcc cagtatgagg    5460
acccaagaaa tcttcattct gctggaagga gcagcagccc tgcaggtgaa acagaggggg    5520
acagagagcc acaggccaga cccggcgagg gcaccgcccc gctcccccca ccaggacaga    5580
aagtgggggg ctctcagccc ccgtttcagg gtcagcggga acctggacct catgctttgg    5640
ggatgtcagg gcttcacggc cccaatttcc cgggaccaag ggggccagcc cctccgtttc    5700
cagaagagaa tatcgcttct aacgatgggc cacgagggcc tccgccagcc agattcggag    5760
cccagaaggg gcccatccct tccttattct cggggcaaca tggccacctt ccttatgggg    5820
acagcagagg ccccctcaccc tcttaccttg gtggaccacg aggagtggca ccatcccaat    5880
ttgaagaacg caaggatccc catggggaga gagggagtt ccaggacgcc ccgtataacg     5940
aggtgacggg cgccccgcc cagtttgaag ggacagagca agcccccatt ctgggaagca     6000
gaggcggcgc gcctttccag ttcggaggcc agagaaggcc actgctgtct cagctgaaag    6060
gcccccgagg cggcccccct ccctctcagt ttggaggtca gagaggacca cccccctggtc   6120 atttcgtggg cccaagaggg cccccatccta gtcagtttga aactgcccgg ggccctcatc    6180
```

```
ccaaccagtt tgaaggaccc agaggccaag cgcctaactt tatgccaggt cccaggggca    6240
ttcagcctca gcagttcgaa gaccagaggg tccattcacc accaagattc acaaaccaaa    6300
gggcgcctgc acccctgcag tttggtggac tacggggtc cgcacccttt tctgaaaaaa     6360
atgagcagac cccttcgcga tttcacttcc agggccaggc cccgcaggtg atgaagccgg    6420
gccccaggcc cctgctggag cttcccagcc acccccgca gcaccggaag gaccgctggg     6480
aggaggccgg gccgccctcc gcgctctcct ccagtgcgcc cggacagggc cccgaggccg    6540
acggacagtg ggcatcggcc gacttccgag aggggaaagg ccacgaatac agaaaccaga    6600
cttcgaagg gaggcagaga gagcggtttg acgtggggcc caaagagaag ccgctggagg     6660
agcccgacgc ccagggccgg gcgtccgagg acaggaggag agagcgcgag cgcggccgaa    6720
actggagccg agagcgggac tgggaccggc cccgggagtg ggaccgacac cgggacaagg    6780
actccagccg ggactgggac agaaaccggg agaggagcgc caaccgcgac cgagagcgcg    6840
aggccgaccg gggcaaggag tgggaccgca gccgggagcg gagcaggaac cgagagcgcg    6900
agcgagaccg gaggcgcgac cgggaccggt cccgagcag agcgggac cgagacaagg       6960
ccagggacag ggagcggggc cgcgaccgca aggaccggag caagagcaaa gagagcgctc    7020
gggacccgaa gcccgaggcc tcgagggcct ccgacgctgg caccgcctcg caggcctaga    7080
cgccccggcc gggcagagac cctttttaaa gccacgttcg taagatgcgt tgaacaaata    7140
gcttttgaaa tagccacgat cttagattca ggatagaata ttctggactt aaacattact    7200
gtaattttgt gtaaatggtt tcttacaaga tttcacatct ttacaattct gatgcttttt    7260
taaaaaaact aaactttaat atttccattt aaaattaaaa gaatgggaa attgcctacg     7320
gagcatattg cttttcagat catagttatc ttttccaata actttattgt aaattttaag    7380
ggagtttcgt tggaccctag agccatacct tcactgacat ctcatccgtt tgtgtttcca    7440
aaagctgctt ttacaggtct tagccgccgc cccggaggcc ggtgtgggcg tgacctgcag    7500
gcgtccaccc tgcggctacg ggagaagtct tagtagcttg tatctggagt cttgagaaac    7560
acaaaccta caaatgcatc tttcttttgt cataaaattg gaattacaat tttcaactgg    7620
gaaacagaaa cacatttctt agcgtgctca gattttatat atcaccttat caattttttc    7680
caaaacatga tttaaagcaa catctgtcct agtataattg ttgcattta aataacaatt    7740
tattgaaaaa tgttaagttt taccagccta aaaaagtaa caaaccaatt aagtgtactt    7800
tgggggcagg gaggagtcct tgatttgaat aatcaggagt tttgttggtc cagtttcgcc    7860
ttctgagcag ttcttctgta tcccgggaaa agtacgctcg gccccaaact ggtatttgtc    7920
agacgataca tgtaaaagtt tgtccttgaa cgtggaacaa gacttgtgta aagtctgaga    7980
cgggaactag tgatcactag ctcaagaact gcaaatgaga caggaagctg ttcactgtga    8040
aacagtctct tgcttgtcgt gtatttttcg agtacttctg aagtgtgaag taaaaaaatc    8100
tggctaattt atttgtacaa atacactttg ataatttttt atattttcat aaacttttac    8160
agatgtaaaa ttaaagaact tcacttgttc tttggagtct gttattccat tgtacgtcac    8220
tacagatttt tcactttata gcacagattt tttaagttaa gaaaacattg agaatgtatc    8280
agtttgagat gtttggtgtt gaaagccaag tgtccatagg ttaaattaca ttaaagtagg    8340
tgtcacgttc caacatctag tacgatgaga aggttttgtt tgtttaacat ataaagcaaa    8400
ttttctaat ttaaatacac aaatgtaaaa atcaagtgtg tttctttagt ttacttgata    8460
gagattcctg tacattgtat tttatattgc ggaggcttat atcactgtac atgagaacat    8520
ggaacgacct aggttttgtt actcgcagta gaataaacag ctacaggaag tttcaaaaaa    8580
```
aaaaaaaaaa aa                                                                        8592

<210> SEQ ID NO 2
<211> LENGTH: 2240
<212> TYPE: PRT
<213> ORGANISM: Homo sapiens

<400> SEQUENCE: 2

Met Asp Asp Lys Gly Asp Pro Ser Asn Glu Glu Ala Pro Lys Ala Ile
1               5                   10                  15

Lys Pro Thr Ser Lys Glu Phe Arg Lys Thr Trp Gly Phe Arg Arg Thr
            20                  25                  30

Thr Ile Ala Lys Arg Glu Gly Ala Gly Asp Ala Glu Ala Asp Pro Leu
        35                  40                  45

Glu Pro Pro Pro Pro Gln Gln Gln Leu Gly Leu Ser Leu Arg Arg Ser
    50                  55                  60

Gly Arg Gln Pro Lys Arg Thr Glu Arg Val Glu Gln Phe Leu Thr Ile
65                  70                  75                  80

Ala Arg Arg Arg Gly Arg Arg Ser Met Pro Val Ser Leu Glu Asp Ser
                85                  90                  95

Gly Glu Pro Thr Ser Cys Pro Ala Thr Asp Ala Glu Thr Ala Ser Glu
            100                 105                 110

Gly Ser Val Glu Ser Ala Ser Glu Thr Arg Ser Gly Pro Gln Ser Ala
        115                 120                 125

Ser Thr Ala Val Lys Glu Arg Pro Ala Ser Ser Glu Lys Val Lys Gly
    130                 135                 140

Gly Asp Asp His Asp Thr Ser Asp Ser Asp Ser Asp Gly Leu Thr
145                 150                 155                 160

Leu Lys Glu Leu Gln Asn Arg Leu Arg Lys Arg Glu Gln Glu Pro
                165                 170                 175

Thr Glu Arg Pro Leu Lys Gly Ile Gln Ser Arg Leu Arg Lys Lys Arg
            180                 185                 190

Arg Glu Glu Gly Pro Ala Glu Thr Val Gly Ser Glu Ala Ser Asp Thr
        195                 200                 205

Val Glu Gly Val Leu Pro Ser Lys Gln Glu Pro Glu Asn Asp Gln Gly
    210                 215                 220

Val Val Ser Gln Ala Gly Lys Asp Asp Arg Glu Ser Lys Leu Glu Gly
225                 230                 235                 240

Lys Ala Ala Gln Asp Ile Lys Asp Glu Glu Pro Gly Asp Leu Gly Arg
                245                 250                 255

Pro Lys Pro Glu Cys Glu Gly Tyr Asp Pro Asn Ala Leu Tyr Cys Ile
            260                 265                 270

Cys Arg Gln Pro His Asn Asn Arg Phe Met Ile Cys Cys Asp Arg Cys
        275                 280                 285

Glu Glu Trp Phe His Gly Asp Cys Val Gly Ile Ser Glu Ala Arg Gly
    290                 295                 300

Arg Leu Leu Glu Arg Asn Gly Glu Asp Tyr Ile Cys Pro Asn Cys Thr
305                 310                 315                 320

Ile Leu Gln Val Gln Asp Glu Thr His Ser Glu Thr Ala Asp Gln Gln
                325                 330                 335

Glu Ala Lys Trp Arg Pro Gly Asp Ala Asp Gly Thr Asp Cys Thr Ser
            340                 345                 350

Ile Gly Thr Ile Glu Gln Lys Ser Ser Glu Asp Gln Gly Ile Lys Gly
        355                 360                 365

-continued

Arg Ile Glu Lys Ala Ala Asn Pro Ser Gly Lys Lys Leu Lys Ile
    370             375             380

Phe Gln Pro Val Ile Glu Ala Pro Gly Ala Ser Lys Cys Ile Gly Pro
385             390             395             400

Gly Cys Cys His Val Ala Gln Pro Asp Ser Val Tyr Cys Ser Asn Asp
            405             410             415

Cys Ile Leu Lys His Ala Ala Thr Met Lys Phe Leu Ser Ser Gly
        420             425             430

Lys Glu Gln Lys Pro Lys Pro Lys Glu Lys Met Lys Met Lys Pro Glu
            435             440             445

Lys Pro Ser Leu Pro Lys Cys Gly Ala Gln Ala Gly Ile Lys Ile Ser
    450             455             460

Ser Val His Lys Arg Pro Ala Pro Glu Lys Lys Glu Thr Thr Val Lys
465             470             475             480

Lys Ala Val Val Val Pro Ala Arg Ser Glu Ala Leu Gly Lys Glu Ala
            485             490             495

Ala Cys Glu Ser Ser Thr Pro Ser Trp Ala Ser Asp His Asn Tyr Asn
            500             505             510

Ala Val Lys Pro Glu Lys Thr Ala Ala Pro Ser Pro Ser Leu Leu Tyr
    515             520             525

Lys Ser Thr Lys Glu Asp Arg Arg Ser Glu Glu Lys Ala Ala Ala Met
    530             535             540

Ala Ala Ser Lys Lys Thr Ala Pro Pro Gly Ser Ala Val Gly Lys Gln
545             550             555             560

Pro Ala Pro Arg Asn Leu Val Pro Lys Lys Ser Phe Ala Asn Val
            565             570             575

Ala Ala Ala Thr Pro Ala Ile Lys Lys Pro Pro Ser Gly Phe Lys Gly
            580             585             590

Thr Ile Pro Lys Arg Pro Trp Leu Ser Ala Thr Pro Ser Ser Gly Ala
    595             600             605

Ser Ala Ala Arg Gln Ala Gly Pro Ala Pro Ala Ala Thr Ala Ala
    610             615             620

Ser Lys Lys Phe Pro Gly Ser Ala Ala Leu Val Gly Ala Val Arg Lys
625             630             635             640

Pro Val Val Pro Ser Val Pro Met Ala Ser Pro Ala Pro Gly Arg Leu
            645             650             655

Gly Ala Met Ser Ala Ala Pro Ser Gln Pro Asn Ser Gln Ile Arg Gln
            660             665             670

Asn Ile Arg Arg Ser Leu Lys Glu Ile Leu Trp Lys Arg Val Asn Asp
            675             680             685

Ser Asp Asp Leu Ile Met Thr Glu Asn Glu Val Gly Lys Ile Ala Leu
    690             695             700

His Ile Glu Lys Glu Met Phe Asn Leu Phe Gln Val Thr Asp Asn Arg
705             710             715             720

Tyr Lys Ser Lys Tyr Arg Ser Ile Met Phe Asn Leu Lys Asp Pro Lys
            725             730             735

Asn Gln Gly Leu Phe His Arg Val Leu Arg Glu Glu Ile Ser Leu Ala
            740             745             750

Lys Leu Val Arg Leu Lys Pro Glu Glu Leu Val Ser Lys Glu Leu Ser
        755             760             765

Thr Trp Lys Glu Arg Pro Ala Arg Ser Val Met Glu Ser Arg Thr Lys
    770             775             780

```
Leu His Asn Glu Ser Lys Lys Thr Ala Pro Arg Gln Glu Ala Ile Pro
785                 790                 795                 800

Asp Leu Glu Asp Ser Pro Pro Val Ser Asp Ser Glu Glu Gln Gln Glu
            805                 810                 815

Ser Ala Arg Ala Val Pro Glu Lys Ser Thr Ala Pro Leu Leu Asp Val
        820                 825                 830

Phe Ser Ser Met Leu Lys Asp Thr Thr Ser Gln His Arg Ala His Leu
            835                 840                 845

Phe Asp Leu Asn Cys Lys Ile Cys Thr Gly Gln Val Pro Ser Ala Glu
        850                 855                 860

Asp Glu Pro Ala Pro Lys Lys Gln Lys Leu Ser Ala Ser Val Lys Lys
865                 870                 875                 880

Glu Asp Leu Lys Ser Lys His Asp Ser Ser Ala Pro Asp Pro Ala Pro
            885                 890                 895

Asp Ser Ala Asp Glu Val Met Pro Glu Ala Val Pro Glu Val Ala Ser
            900                 905                 910

Glu Pro Gly Leu Glu Ser Ala Ser His Pro Asn Val Asp Arg Thr Tyr
            915                 920                 925

Phe Pro Gly Pro Pro Gly Asp Gly His Pro Glu Pro Ser Pro Leu Glu
        930                 935                 940

Asp Leu Ser Pro Cys Pro Ala Ser Cys Gly Ser Gly Val Val Thr Thr
945                 950                 955                 960

Val Thr Val Ser Gly Arg Asp Pro Arg Thr Ala Pro Ser Ser Ser Cys
            965                 970                 975

Thr Ala Val Ala Ser Ala Ala Ser Arg Pro Asp Ser Thr His Met Val
            980                 985                 990

Glu Ala Arg Gln Asp Val Pro Lys Pro Val Leu Thr Ser Val Met Val
            995                 1000                1005

Pro Lys Ser Ile Leu Ala Lys Pro Ser Ser Ser Pro Asp Pro Arg
    1010                1015                1020

Tyr Leu Ser Val Pro Pro Ser Pro Asn Ile Ser Thr Ser Glu Ser
    1025                1030                1035

Arg Ser Pro Pro Glu Gly Asp Thr Thr Leu Phe Leu Ser Arg Leu
    1040                1045                1050

Ser Thr Ile Trp Lys Gly Phe Ile Asn Met Gln Ser Val Ala Lys
    1055                1060                1065

Phe Val Thr Lys Ala Tyr Pro Val Ser Gly Cys Phe Asp Tyr Leu
    1070                1075                1080

Ser Glu Asp Leu Pro Asp Thr Ile His Ile Gly Gly Arg Ile Ala
    1085                1090                1095

Pro Lys Thr Val Trp Asp Tyr Val Gly Lys Leu Lys Ser Ser Val
    1100                1105                1110

Ser Lys Glu Leu Cys Leu Ile Arg Phe His Pro Ala Thr Glu Glu
    1115                1120                1125

Glu Glu Val Ala Tyr Ile Ser Leu Tyr Ser Tyr Phe Ser Ser Arg
    1130                1135                1140

Gly Arg Phe Gly Val Val Ala Asn Asn Asn Arg His Val Lys Asp
    1145                1150                1155

Leu Tyr Leu Ile Pro Leu Ser Ala Gln Asp Pro Val Pro Ser Lys
    1160                1165                1170

Leu Leu Pro Phe Glu Gly Pro Gly Leu Glu Ser Pro Arg Pro Asn
    1175                1180                1185

Ile Ile Leu Gly Leu Val Ile Cys Gln Lys Ile Lys Arg Pro Ala
```

-continued

```
            1190                1195                1200
Asn Ser Gly Glu Leu Asp Lys Met Asp Glu Lys Arg Thr Arg Leu
        1205                1210                1215
Gln Pro Glu Glu Ala Asp Val Pro Ala Tyr Pro Lys Val Ala Thr
        1220                1225                1230
Val Pro Gln Ser Glu Lys Lys Pro Ser Lys Tyr Pro Leu Cys Ser
        1235                1240                1245
Ala Asp Ala Ala Val Ser Thr Thr Pro Pro Gly Ser Pro Pro Pro
        1250                1255                1260
Pro Pro Pro Leu Pro Glu Pro Pro Val Leu Lys Val Leu Ser Ser
        1265                1270                1275
Leu Lys Pro Ala Ala Pro Ser Pro Ala Thr Ala Ala Thr Thr Ala
        1280                1285                1290
Ala Ala Ala Ser Thr Ala Ala Ser Ser Thr Ala Ser Ser Ala Ser
        1295                1300                1305
Lys Thr Ala Ser Pro Leu Glu His Ile Leu Gln Thr Leu Phe Gly
        1310                1315                1320
Lys Lys Lys Ser Phe Asp Pro Ser Ala Arg Glu Pro Pro Gly Ser
        1325                1330                1335
Thr Ala Gly Leu Pro Gln Glu Pro Lys Thr Thr Ala Glu Asp Gly
        1340                1345                1350
Val Pro Ala Pro Pro Leu Leu Asp Pro Ile Val Gln Gln Phe Gly
        1355                1360                1365
Gln Phe Ser Lys Asp Lys Ala Leu Glu Glu Glu Asp Asp Arg
        1370                1375                1380
Pro Tyr Asp Pro Glu Glu Glu Tyr Asp Pro Glu Arg Ala Phe Asp
        1385                1390                1395
Thr Gln Leu Val Glu Arg Gly Arg Arg His Glu Val Glu Arg Ala
        1400                1405                1410
Pro Glu Ala Ala Ala Ala Glu Arg Glu Glu Val Ala Tyr Asp Pro
        1415                1420                1425
Glu Asp Glu Thr Ile Leu Glu Glu Ala Lys Val Thr Val Asp Asp
        1430                1435                1440
Leu Pro Asn Arg Met Cys Ala Asp Val Arg Arg Asn Ser Val Glu
        1445                1450                1455
Arg Pro Ala Glu Pro Val Ala Gly Ala Ala Thr Pro Ser Leu Val
        1460                1465                1470
Glu Gln Gln Lys Met Leu Glu Leu Asn Lys Gln Ile Glu Glu
        1475                1480                1485
Gln Lys Arg Gln Leu Glu Glu Gln Glu Glu Ala Leu Arg Gln Gln
        1490                1495                1500
Arg Ala Ala Val Gly Val Ser Met Ala His Phe Ser Val Ser Asp
        1505                1510                1515
Ala Leu Met Ser Pro Pro Lys Ser Ser Leu Pro Lys Ala Glu
        1520                1525                1530
Leu Phe Gln Gln Glu Gln Gln Ser Ala Asp Lys Pro Ala Ser Leu
        1535                1540                1545
Pro Pro Ala Ser Gln Ala Ser Asn His Arg Asp Pro Arg Gln Ala
        1550                1555                1560
Arg Arg Leu Ala Thr Glu Thr Gly Glu Gly Gly Glu Pro Leu
        1565                1570                1575
Ser Arg Leu Ser Ala Arg Gly Ala Gln Gly Ala Leu Pro Glu Arg
        1580                1585                1590
```

```
Asp Ala Ser Arg Gly Gly Leu Val Gly Gln Ala Pro Met Pro Val
1595                1600                1605

Pro Glu Glu Lys Glu Pro Ala Ser Ser Pro Trp Ala Ser Gly Glu
1610                1615                1620

Lys Pro Pro Ala Gly Ser Glu Gln Asp Gly Trp Lys Ala Glu Pro
1625                1630                1635

Gly Glu Gly Thr Arg Pro Ala Thr Val Gly Asp Ser Ser Ala Arg
1640                1645                1650

Pro Ala Arg Arg Val Leu Leu Pro Thr Pro Pro Cys Gly Ala Leu
1655                1660                1665

Gln Pro Gly Phe Pro Leu Gln His Asp Gly Glu Arg Asp Pro Phe
1670                1675                1680

Thr Cys Pro Gly Phe Ala Ser Gln Asp Lys Ala Leu Gly Ser Ala
1685                1690                1695

Gln Tyr Glu Asp Pro Arg Asn Leu His Ser Ala Gly Arg Ser Ser
1700                1705                1710

Ser Pro Ala Gly Glu Thr Glu Gly Asp Arg Glu Pro Gln Ala Arg
1715                1720                1725

Pro Gly Glu Gly Thr Ala Pro Leu Pro Pro Pro Gly Gln Lys Val
1730                1735                1740

Gly Gly Ser Gln Pro Pro Phe Gln Gly Gln Arg Glu Pro Gly Pro
1745                1750                1755

His Ala Leu Gly Met Ser Gly Leu His Gly Pro Asn Phe Pro Gly
1760                1765                1770

Pro Arg Gly Pro Ala Pro Pro Phe Pro Glu Glu Asn Ile Ala Ser
1775                1780                1785

Asn Asp Gly Pro Arg Gly Pro Pro Ala Arg Phe Gly Ala Gln
1790                1795                1800

Lys Gly Pro Ile Pro Ser Leu Phe Ser Gly Gln His Gly Pro Pro
1805                1810                1815

Pro Tyr Gly Asp Ser Arg Gly Pro Ser Pro Ser Tyr Leu Gly Gly
1820                1825                1830

Pro Arg Gly Val Ala Pro Ser Gln Phe Glu Glu Arg Lys Asp Pro
1835                1840                1845

His Gly Glu Lys Arg Glu Phe Gln Asp Ala Pro Tyr Asn Glu Val
1850                1855                1860

Thr Gly Ala Pro Ala Gln Phe Glu Gly Thr Glu Gln Ala Pro Phe
1865                1870                1875

Leu Gly Ser Arg Gly Gly Ala Pro Phe Gln Phe Gly Gly Gln Arg
1880                1885                1890

Arg Pro Leu Leu Ser Gln Leu Lys Gly Pro Arg Gly Gly Pro Pro
1895                1900                1905

Pro Ser Gln Phe Gly Gly Gln Arg Gly Pro Pro Gly His Phe
1910                1915                1920

Val Gly Pro Arg Gly Pro His Pro Ser Gln Phe Glu Thr Ala Arg
1925                1930                1935

Gly Pro His Pro Asn Gln Phe Glu Gly Pro Arg Gly Gln Ala Pro
1940                1945                1950

Asn Phe Met Pro Gly Pro Arg Gly Ile Gln Pro Gln Gln Phe Glu
1955                1960                1965

Asp Gln Arg Val His Ser Pro Pro Arg Phe Thr Asn Gln Arg Ala
1970                1975                1980
```

-continued

```
Pro Ala Pro Leu Gln Phe Gly Gly Leu Arg Gly Ser Ala Pro Phe
    1985               1990                1995

Ser Glu Lys Asn Glu Gln Thr Pro Ser Arg Phe His Phe Gln Gly
    2000                2005                2010

Gln Ala Pro Gln Val Met Lys Pro Gly Pro Arg Pro Leu Leu Glu
    2015                2020                2025

Leu Pro Ser His Pro Pro Gln His Arg Lys Asp Arg Trp Glu Glu
    2030                2035                2040

Ala Gly Pro Pro Ser Ala Leu Ser Ser Ser Ala Pro Gly Gln Gly
    2045                2050                2055

Pro Glu Ala Asp Gly Gln Trp Ala Ser Ala Asp Phe Arg Glu Gly
    2060                2065                2070

Lys Gly His Glu Tyr Arg Asn Gln Thr Phe Glu Gly Arg Gln Arg
    2075                2080                2085

Glu Arg Phe Asp Val Gly Pro Lys Glu Lys Pro Leu Glu Glu Pro
    2090                2095                2100

Asp Ala Gln Gly Arg Ala Ser Glu Asp Arg Arg Glu Arg Glu
    2105                2110                2115

Arg Gly Arg Asn Trp Ser Arg Glu Arg Asp Trp Asp Arg Pro Arg
    2120                2125                2130

Glu Trp Asp Arg His Arg Asp Lys Asp Ser Ser Arg Asp Trp Asp
    2135                2140                2145

Arg Asn Arg Glu Arg Ser Ala Asn Arg Asp Arg Glu Arg Glu Ala
    2150                2155                2160

Asp Arg Gly Lys Glu Trp Asp Arg Ser Arg Glu Arg Ser Arg Asn
    2165                2170                2175

Arg Glu Arg Glu Arg Asp Arg Arg Asp Arg Asp Arg Ser Arg
    2180                2185                2190

Ser Arg Glu Arg Asp Arg Asp Lys Ala Arg Asp Arg Glu Arg Gly
    2195                2200                2205

Arg Asp Arg Lys Asp Arg Ser Lys Ser Lys Glu Ser Ala Arg Asp
    2210                2215                2220

Pro Lys Pro Glu Ala Ser Arg Ala Ser Asp Ala Gly Thr Ala Ser
    2225                2230                2235

Gln Ala
    2240

<210> SEQ ID NO 3
<211> LENGTH: 275
<212> TYPE: PRT
<213> ORGANISM: Homo sapiens

<400> SEQUENCE: 3

Met Asp Asp Lys Gly Asp Pro Ser Asn Glu Glu Ala Pro Lys Ala Ile
1               5                   10                  15

Lys Pro Thr Ser Lys Glu Phe Arg Lys Thr Trp Gly Phe Arg Arg Thr
                20                  25                  30

Thr Ile Ala Lys Arg Glu Gly Ala Gly Asp Ala Glu Ala Asp Pro Leu
            35                  40                  45

Glu Pro Pro Pro Gln Gln Gln Leu Gly Leu Ser Leu Arg Arg Ser
        50                  55                  60

Gly Arg Gln Pro Lys Arg Thr Glu Arg Val Glu Gln Phe Leu Thr Ile
65                  70                  75                  80

Ala Arg Arg Arg Gly Arg Arg Ser Met Pro Val Ser Leu Glu Asp Ser
                85                  90                  95
```

```
Gly Glu Pro Thr Ser Cys Pro Ala Thr Asp Ala Glu Thr Ala Ser Glu
            100                 105                 110
Gly Ser Val Glu Ser Ala Ser Glu Thr Arg Ser Gly Pro Gln Ser Ala
        115                 120                 125
Ser Thr Ala Val Lys Glu Arg Pro Ala Ser Ser Glu Lys Val Lys Gly
    130                 135                 140
Gly Asp His Asp Asp Thr Ser Asp Ser Asp Gly Leu Thr
145                 150                 155                 160
Leu Lys Glu Leu Gln Asn Arg Leu Arg Arg Lys Arg Glu Gln Glu Pro
                165                 170                 175
Thr Glu Arg Pro Leu Lys Gly Ile Gln Ser Arg Leu Arg Lys Lys Arg
            180                 185                 190
Arg Glu Glu Gly Pro Ala Glu Thr Val Gly Ser Glu Ala Ser Asp Thr
        195                 200                 205
Val Glu Gly Val Leu Pro Ser Lys Gln Glu Pro Glu Asn Asp Gln Gly
    210                 215                 220
Val Val Ser Gln Ala Gly Lys Asp Asp Arg Glu Ser Lys Leu Glu Gly
225                 230                 235                 240
Lys Ala Ala Gln Asp Ile Lys Asp Glu Glu Pro Gly Asp Leu Gly Arg
                245                 250                 255
Pro Lys Pro Glu Cys Glu Gly Tyr Asp Pro Asn Ala Leu Tyr Cys Ile
            260                 265                 270
Cys Arg Gln
        275

<210> SEQ ID NO 4
<211> LENGTH: 18
<212> TYPE: PRT
<213> ORGANISM: Homo sapiens

<400> SEQUENCE: 4

Ala Met Ala Ala Ser Lys Lys Thr Ala Pro Pro Gly Ser Ala Val Gly
1               5                   10                  15

Lys Gln

<210> SEQ ID NO 5
<211> LENGTH: 5072
<212> TYPE: DNA
<213> ORGANISM: Homo sapiens

<400> SEQUENCE: 5
ctcctcgtct ccgccgctag tctccagctc caaaatggcg gctgccactg tggggcttct      60
gccggccggt agtccctggc gctgctgacc cagcatcggc ttttctacgt cttgaacctg     120
gattcgccta ggggttggga agggctgtgg acggcgttgg gggaggcctg acgagattaa     180
taaagaactc ttcagaattc ctggtgtttc atcatatata cgactaagat atcaactctt     240
ctagcttgct gtttctggac caaaaaaaat gacgtctatt atcaaattaa ctaccctttc     300
tggggtccaa gaagaatctg ccctttgcta tcttctccaa gttgatgagt ttagattttt     360
attggactgt ggctgggatg agcactttc tatggatatt attgattccc tgaggaagca     420
tgttcaccag attgatgcag tgctgttgtc tcaccctgat cctctccacc ttggtgccct     480
cccgtatgct gtcggaaagt tgggtctgaa ctgtgctatc tatgcaacca ttcctgttta     540
taaaatggga cagatgttca tgtatgatct ttatcagtct cgacacaata cagaagattt     600
tacactcttt acattagatg atgtggatgc agcctttgat aaaatacagc agctaaaatt     660
```

-continued

```
ctctcagatt gtgaatttga aaggtaaagg acatggcctg tctatcacac ctctgccagc    720
tggtcatatg ataggtggaa caatatggaa aatagtcaaa gatggagaag aagaaattgt    780
ttatgcagtt gacttcaacc acaagaggga gatccattta aatggatgtt ccctggaaat    840
gctaagcagg ccttccctac ttatcacaga ttcattcaat gctacatatg tacagcctag    900
aagaaaacag agagatgagc agcttctgac aaatgtcctg gaaacacttc gaggtgatgg    960
aaatgtgtta atagcagtgg acacagcagg cagagttttg gaacttgctc aacttcttga   1020
tcagatttgg aggactaaag atgcaggatt gggtgtttac tcattggcac tcctaaataa   1080
tgtcagttac aatgtggtgg agttttctaa gtcccaggta gaatggatga gtgataaatt   1140
gatgagatgt tttgaagaca aaagaaataa tccgtttcag tttcgccatc tctctttatg   1200
tcatggtctt tctgacttgg cccgtgtacc tagccctaaa gttgtacttg ccagccaacc   1260
tgacctggaa tgcggatttt caagggatct ctttattcag tggtgtcagg accctaaaaa   1320
ctcaatcatt ctaacctaca gaactactcc tgggacttta gcacgtttcc taattgataa   1380
tccttctgaa aaaattacag aaatagagtt gaggaaacgt gtgaagcttg aagggaaaga   1440
acttgaagaa tacttggaaa agagaaaact aaagaaagaa gctgccaaaa agcttgagca   1500
gtcaaaagag gcagatatag attccagtga tgagagtgat attgaggaag atattgacca   1560
gccatcagct cataagacga agcatgactt gatgatgaaa ggtgaaggca gtcgtaaagg   1620
aagttttttc aaacaggcaa aaaagtccta tcctatgttt cctgccccag aagaaagaat   1680
taaatgggat gaatatggag agattatcaa accagaggat ttcttagtgc cagagcttca   1740
agctactgaa gaagaaaaaa gcaaattaga atctggtttg acaaatggag atgaacctat   1800
ggatcaggat ttatctgatg ttcctactaa atgtatttct acaacagagt ctattgaaat   1860
aaaagcccgg gttacctaca tagactatga aggacgctct gatggggatt ccattaaaaa   1920
aatcattaat cagatgaaac cacgacagtt gatcatcgtc catggcccac cagaggccag   1980
tcaagatctg gcagagtgct gtcgcgcctt tggtgggaaa gatattaaag tgtacatgcc   2040
aaagctacat gaaacagttg atgccactag tgaaactcac atctaccagg tgaggttaaa   2100
agactcactt gtcagctctc ttcagttttg taaggcaaaa gatgctgaat tagcttggat   2160
agatggtgtc ttagatatga gagttttccaa agtggacaca ggggttattt tagaagaagg   2220
agaactaaag gatgatggag aagactcaga gatgcaagtg gaagctccct cagattctag   2280
cgttatagca caacaaaagg ccatgaaaag tctgttcgga gatgatgaaa agaaacagg    2340 tgaagaaagt gagatcattc ctactttgga acccttgcca cctcatgagg ttcctggaca   2400
tcagtcagtt tttatgaatg aaccaaggct gtcagacttc aagcaagttc tcttacggga   2460
ggggattcaa gctgaatttg taggaggtgt acttgtttgc aacaatcaag tagcagtccg   2520
cagaacggaa actggacgca ttggattaga aggctgcctt tgtcaagatt tttataggat   2580
aagagacctt ttatatgaac aatatgccat tgtataaagg acatgatgtc aagaagtatc   2640
tgcttgacct ttctaagaaa aagggattct tatcttactc tgagcttttg atgttttgtt   2700
ttgtaacata caaaaagaat ctgccagaaa aacttacatg tatcagattt ttaaaaatat   2760
aaatagagaa cattttgcaa atgctcaaat gagcattcta tcttttggct ttcagagtga   2820
tagagctcct aacaggtgta caggcccaag agttgaaggt gattggtttt ctttacagac   2880
tccttgttct ctagaagggc ttttacttg aataaaacaa tgcaacttag caaaccaatt   2940
tatggcctta gagaaacatt tttgcatgag ttcttacaaa ctgtttgtta tattttctgg   3000
```

| | |
|---|---|
| aatgataagt gagaattatt tagaaaagac atgctccaaa aaaaaaacaa aactgataaa | 3060 |
| acagttttc gaaacttact tttaaaagca tacgtgctat gactctctcc agtttgaata | 3120 |
| tgcaattgtt ttcacaggca ggatgtctgt tttctgcctg tatttcccag tgatttactc | 3180 |
| tagggtaagg tagtacacat ttggttcaga aattaatttt tatttctcct atatcttgtt | 3240 |
| ttatcaagat tttgttgtgg catttcaatg taaattataa caccatcatt tgagtataca | 3300 |
| taattcaaaa gaactacttg atgcagtata gtcttaaggg ttctgcatac attttagaaa | 3360 |
| catcttagcc gtaagttagg tcctgtgtta aactgtttag tgctctgttt ttaagaaaac | 3420 |
| aaatgttgaa cctcacactt ttatgtggtg acagtgtaat ttaattaaaa ggtgtaaatg | 3480 |
| ttttcatctc ttaggcttgc tgtctcctaa ggtcacccaa gcagtggttg dattttatac | 3540 |
| acattactac taaaataata ctgaagttgg ataaggttat cctttctgta tttgcgtctt | 3600 |
| tcttgtgact aaccaccctg atatagtatt aaccactgtg ttcaagagta aaacaatat | 3660 |
| atgcaatttt cattgaactt aaagagtgaa aaccatgtaa actattgaaa ctattgtaat | 3720 |
| ccattaatgc ttttttagaa tggcagacct tgatgtttat ttctcaaatg gttaagccct | 3780 |
| cttctttact cttaattttt ttttgagaca gagtcaccca ggctggagtg cagtggtgag | 3840 |
| attttggctc actataacct cttcctccag ggttcaagtg attctcccac ctcagcctcc | 3900 |
| caagtagctg ggactacggg cacatgccac tgcacctggc taattttat attttggta | 3960 |
| gagacagggt ttcaccatgt tggccaggct ggtctcaaac tcctgacctc aagcgatcca | 4020 |
| cccacctagg cctcccaaag tgctgggatt acaggcatga atcaccacaa ctagcctacc | 4080 |
| cttagatttt tggaaggatc gatcttattt aactatgtgt ggaacaaccc agtaatatca | 4140 |
| gactcgaatt actatttcat tctatttcaa atgcttataa agctactatt gtagattata | 4200 |
| gtgttaatgc aaagtttaca gacttttgat atggaaaacc agataaaaca atgttacaaa | 4260 |
| aggcaaatat aaagagtatg ttttctttt agtgctttgg aaaaatttca cttaaactct | 4320 |
| tattactgta tagattaagc cctataatgc tattatatt ccaggggaac gaaaatctga | 4380 |
| atttgtttta tgatttaaag catctggttt gcatattgta ttgtaatact gatacagttt | 4440 |
| ggctgtgtcc ccaccaaatt gaattgtgtt aatagttccc ataatcccta cgtgttgtgg | 4500 |
| gagggaccca gtgggcagta atttaatcat ggtggtggtt accctcatgc tgttcttgtg | 4560 |
| atggtgagtt ctcatgagat ctgatgggtg tttttttttg ttttgttttt tgttttttga | 4620 |
| gatggagttt tgctcttgtt gcccagactg gagtgcaatg gcacacgatc tcggctcacc | 4680 |
| gcaacctctg cctcctgggt tcaagcgatt ctcctgcctc agcatctcga gtagctggga | 4740 |
| ttacaggcat gcaccaccac gcccagctaa ttttgtattt ttagtagaga cggggtttct | 4800 |
| ccatgttggt taggctggcc tcaaactccc gacctcaggt gatccgcccg cctgggcctc | 4860 |
| ccaaagtgct gggattacag gcgtgagcca ctgctcctgg cccaagatct gatggttttg | 4920 |
| taagggaatt ttccccctt gcttggcact tcttcctgct gccatgtgaa gaaggatgtg | 4980 |
| tttgcttccc cttccaccat gattgtaagt ttcatgaggc ctccccagcc tgtgggactg | 5040 |
| tgagtcaatt aaacgtgttt actttataaa tt | 5072 |

<210> SEQ ID NO 6
<211> LENGTH: 782
<212> TYPE: PRT
<213> ORGANISM: Homo sapiens

<400> SEQUENCE: 6

Met Thr Ser Ile Ile Lys Leu Thr Thr Leu Ser Gly Val Gln Glu Glu

-continued

```
1               5                   10                  15
Ser Ala Leu Cys Tyr Leu Leu Gln Val Asp Glu Phe Arg Phe Leu Leu
            20                  25                  30

Asp Cys Gly Trp Asp Glu His Phe Ser Met Asp Ile Ile Asp Ser Leu
            35                  40                  45

Arg Lys His Val His Gln Ile Asp Ala Val Leu Leu Ser His Pro Asp
    50                  55                  60

Pro Leu His Leu Gly Ala Leu Pro Tyr Ala Val Gly Lys Leu Gly Leu
65                  70                  75                  80

Asn Cys Ala Ile Tyr Ala Thr Ile Pro Val Tyr Lys Met Gly Gln Met
                85                  90                  95

Phe Met Tyr Asp Leu Tyr Gln Ser Arg His Asn Thr Glu Asp Phe Thr
                100                 105                 110

Leu Phe Thr Leu Asp Asp Val Asp Ala Ala Phe Asp Lys Ile Gln Gln
                115                 120                 125

Leu Lys Phe Ser Gln Ile Val Asn Leu Lys Gly Lys Gly His Gly Leu
                130                 135                 140

Ser Ile Thr Pro Leu Pro Ala Gly His Met Ile Gly Gly Thr Ile Trp
145                 150                 155                 160

Lys Ile Val Lys Asp Gly Glu Glu Glu Ile Val Tyr Ala Val Asp Phe
                165                 170                 175

Asn His Lys Arg Glu Ile His Leu Asn Gly Cys Ser Leu Glu Met Leu
                180                 185                 190

Ser Arg Pro Ser Leu Leu Ile Thr Asp Ser Phe Asn Ala Thr Tyr Val
                195                 200                 205

Gln Pro Arg Arg Lys Gln Arg Asp Glu Gln Leu Leu Thr Asn Val Leu
                210                 215                 220

Glu Thr Leu Arg Gly Asp Gly Asn Val Leu Ile Ala Val Asp Thr Ala
225                 230                 235                 240

Gly Arg Val Leu Glu Leu Ala Gln Leu Leu Asp Gln Ile Trp Arg Thr
                245                 250                 255

Lys Asp Ala Gly Leu Gly Val Tyr Ser Leu Ala Leu Leu Asn Asn Val
                260                 265                 270

Ser Tyr Asn Val Val Glu Phe Ser Lys Ser Gln Val Glu Trp Met Ser
                275                 280                 285

Asp Lys Leu Met Arg Cys Phe Glu Asp Lys Arg Asn Asn Pro Phe Gln
                290                 295                 300

Phe Arg His Leu Ser Leu Cys His Gly Leu Ser Asp Leu Ala Arg Val
305                 310                 315                 320

Pro Ser Pro Lys Val Val Leu Ala Ser Gln Pro Asp Leu Glu Cys Gly
                325                 330                 335

Phe Ser Arg Asp Leu Phe Ile Gln Trp Cys Gln Asp Pro Lys Asn Ser
                340                 345                 350

Ile Ile Leu Thr Tyr Arg Thr Thr Pro Gly Thr Leu Ala Arg Phe Leu
                355                 360                 365

Ile Asp Asn Pro Ser Glu Lys Ile Thr Glu Ile Glu Leu Arg Lys Arg
                370                 375                 380

Val Lys Leu Glu Gly Lys Glu Leu Glu Glu Tyr Leu Glu Lys Glu Lys
385                 390                 395                 400

Leu Lys Lys Glu Ala Lys Lys Leu Glu Gln Ser Lys Glu Ala Asp
                405                 410                 415

Ile Asp Ser Ser Asp Glu Ser Asp Ile Glu Glu Asp Ile Asp Gln Pro
                420                 425                 430
```

```
Ser Ala His Lys Thr Lys His Asp Leu Met Met Lys Gly Glu Gly Ser
            435                 440                 445

Arg Lys Gly Ser Phe Phe Lys Gln Ala Lys Lys Ser Tyr Pro Met Phe
    450                 455                 460

Pro Ala Pro Glu Glu Arg Ile Lys Trp Asp Glu Tyr Gly Glu Ile Ile
465                 470                 475                 480

Lys Pro Glu Asp Phe Leu Val Pro Leu Gln Ala Thr Glu Glu
                485                 490                 495

Lys Ser Lys Leu Glu Ser Gly Leu Thr Asn Gly Asp Glu Pro Met Asp
            500                 505                 510

Gln Asp Leu Ser Asp Val Pro Thr Lys Cys Ile Ser Thr Thr Glu Ser
            515                 520                 525

Ile Glu Ile Lys Ala Arg Val Thr Tyr Ile Asp Tyr Glu Gly Arg Ser
            530                 535                 540

Asp Gly Asp Ser Ile Lys Lys Ile Ile Asn Gln Met Lys Pro Arg Gln
545                 550                 555                 560

Leu Ile Ile Val His Gly Pro Pro Glu Ala Ser Gln Asp Leu Ala Glu
                565                 570                 575

Cys Cys Arg Ala Phe Gly Gly Lys Asp Ile Lys Val Tyr Met Pro Lys
            580                 585                 590

Leu His Glu Thr Val Asp Ala Thr Ser Glu Thr His Ile Tyr Gln Val
            595                 600                 605

Arg Leu Lys Asp Ser Leu Val Ser Ser Leu Gln Phe Cys Lys Ala Lys
            610                 615                 620

Asp Ala Glu Leu Ala Trp Ile Asp Gly Val Leu Asp Met Arg Val Ser
625                 630                 635                 640

Lys Val Asp Thr Gly Val Ile Leu Glu Glu Gly Glu Leu Lys Asp Asp
                645                 650                 655

Gly Glu Asp Ser Glu Met Gln Val Glu Ala Pro Ser Asp Ser Ser Val
            660                 665                 670

Ile Ala Gln Gln Lys Ala Met Lys Ser Leu Phe Gly Asp Asp Glu Lys
            675                 680                 685

Glu Thr Gly Glu Glu Ser Glu Ile Ile Pro Thr Leu Glu Pro Leu Pro
            690                 695                 700

Pro His Glu Val Pro Gly His Gln Ser Val Phe Met Asn Glu Pro Arg
705                 710                 715                 720

Leu Ser Asp Phe Lys Gln Val Leu Leu Arg Glu Gly Ile Gln Ala Glu
                725                 730                 735

Phe Val Gly Gly Val Leu Val Cys Asn Asn Gln Val Ala Val Arg Arg
            740                 745                 750

Thr Glu Thr Gly Arg Ile Gly Leu Glu Gly Cys Leu Cys Gln Asp Phe
            755                 760                 765

Tyr Arg Ile Arg Asp Leu Leu Tyr Glu Gln Tyr Ala Ile Val
            770                 775                 780

<210> SEQ ID NO 7
<211> LENGTH: 15
<212> TYPE: PRT
<213> ORGANISM: Homo sapiens

<400> SEQUENCE: 7

Gln Val Arg Leu Lys Asp Ser Leu Val Ser Ser Leu Gln Phe Cys
1               5                   10                  15
```